US010738756B2

(12) United States Patent
Yang

(10) Patent No.: US 10,738,756 B2
(45) Date of Patent: Aug. 11, 2020

(54) WAVE ENERGY CONVERTER

(71) Applicant: Yingchen Yang, Edinburg, TX (US)

(72) Inventor: Yingchen Yang, Edinburg, TX (US)

(73) Assignee: THE BOARD OF REGENTS OF THE UNIVERSITY OF TEXAS SYSTEM, Austin, TX (US)

(*) Notice: Subject to any disclaimer, the term of this patent is extended or adjusted under 35 U.S.C. 154(b) by 0 days.

(21) Appl. No.: 15/301,823

(22) PCT Filed: Sep. 21, 2016

(86) PCT No.: PCT/US2016/052837
§ 371 (c)(1),
(2) Date: Oct. 4, 2016

(87) PCT Pub. No.: WO2017/053395
PCT Pub. Date: Mar. 30, 2017

(65) Prior Publication Data
US 2018/0202412 A1 Jul. 19, 2018

Related U.S. Application Data

(60) Provisional application No. 62/221,482, filed on Sep. 21, 2015.

(51) Int. Cl.
F03B 13/18 (2006.01)
F03B 13/10 (2006.01)

(52) U.S. Cl.
CPC ............ F03B 13/183 (2013.01); F03B 13/10 (2013.01); F05B 2220/7066 (2013.01); F05B 2240/24 (2013.01); F05B 2240/30 (2013.01); F05B 2240/40 (2013.01); F05B 2240/97 (2013.01); Y02E 10/38 (2013.01)

(58) Field of Classification Search
CPC ...................................... F03B 13/183
See application file for complete search history.

(56) References Cited

U.S. PATENT DOCUMENTS 4,313,711 A    2/1982 Lee ................................. 415/7
4,447,740 A *  5/1984 Heck ...................... F03B 13/22
                                                     290/53

(Continued)

FOREIGN PATENT DOCUMENTS

WO    WO/00/017519      3/2000
WO    WO/06/100436      9/2006

(Continued)

OTHER PUBLICATIONS

Faizal et al, 2009, Renewable Energy, 35, 164-169.

(Continued)

Primary Examiner — David E Sosnowski
Assistant Examiner — Jason A Fountain
(74) Attorney, Agent, or Firm — Norton Rose Fulbright US LLP

(57) ABSTRACT

Certain embodiments are directed to a vertical axis unidirectional rotor for wave energy conversion, said rotor comprising a plurality of spatially distributed lift-type and/or drag-type blades and a shaft, said rotor performing unidirectional rotation in waves about the shaft that is vertically oriented.

13 Claims, 14 Drawing Sheets

(56) References Cited

U.S. PATENT DOCUMENTS

| | | | | |
|---|---|---|---|---|
| 5,133,637 | A * | 7/1992 | Wadsworth | F03D 3/065 |
| | | | | 415/4.1 |
| 8,100,650 | B2 | 1/2012 | Siegel | 416/53 |
| 8,206,113 | B2 | 6/2012 | Ryynanen et al. | 416/176 |
| 10,047,723 | B2 * | 8/2018 | Akimoto | F03B 17/063 |
| 2009/0211241 | A1 | 8/2009 | Moffat | 60/501 |
| 2010/0320766 | A1 | 12/2010 | Klukowski | 290/53 |
| 2014/0327338 | A1 | 11/2014 | Vamvas | 310/306 |
| 2015/0130191 | A1 * | 5/2015 | Houvener | F03B 11/00 |
| | | | | 290/1 A |

FOREIGN PATENT DOCUMENTS

| | | |
|---|---|---|
| WO | WO/07/130334 | 11/2007 |
| WO | WO/10/011133 | 1/2010 |
| WO | WO/12/166063 | 12/2012 |

OTHER PUBLICATIONS

International Search Report and Written Opinion in International Application No. PCT/US2016/052837 dated Dec. 12, 2016.
Mohamed, *Energy*, 47:522-30, 2012.
Pierson and Moskowitz, *Journal of Geophysical Research*, 69:5181-90, 1964.
Pindado et al., *The Scientific World Journal*, Article ID 197325, 2013.
Raghunathan, *Progress in Aerospace Sciences*, 31:335-386, 1995.

* cited by examiner

WAVE ENERGY CONVERTER

This application is a national phase application under 35 U.S.C. § 371 of International Application No. PCT/US2016/052837, filed Sep. 21, 2016 which claims priority to U.S. Provisional Patent Application 62/221,482 filed Sep. 21, 2015. Both applications are hereby incorporated by reference in their entirety.

STATEMENT REGARDING FEDERALLY FUNDED RESEARCH

This invention was made with government support under 1263196 awarded by the National Science Foundation. The government has certain rights in the invention.

BACKGROUND

The present invention relates to wave energy converters and, in certain aspects, methods and apparatus for harnessing hydrokinetic renewable energy from ocean waves to produce electricity.

Wave energy is a concentrated form of renewable energy generated by friction between the water surface and the wind. The energy is built up by the wind on the open seas and then transported to locations closer to the shore, where it can be extracted with wave energy converters. Due to the high energy density of ocean waves, wave power is very area efficient and the average energy content changes more slowly and predictably compared to the wind etc. The resources are vast and can be harvested close to populated areas.

However, there are challenges that must be solved before wave power can be commercially viable. Intermittent and highly fluctuating energy from the ocean waves must efficiently be converted into a steady output of electricity that is suitable for the power grid. Ocean waves vary in height, length, direction and time period (velocity) from wave to wave at a given sea state. A sea state is defined by the significant wave height (Hs) which is calculated from the average of the highest ⅓ of 100 waves in a row. The sea state will change slowly but largely over time; in storm conditions the average energy content in a sea state can be over 100 times higher than during normal conditions (annual average).

A majority of patents directed to wave energy converters (WECs) are directed to reciprocating WECs. Reciprocating WECs use wave-driven reciprocating motions such as heave, pitch, sway, reciprocating bending or curving, etc. for energy harvesting. Well-known examples that have been developed or under development include PowerBuoy (WO2007130334 A3), Pelamis (WO2000017519 A1) and Oyster (WO2006100436 A1) among others. This class of WECs relies on resonance to achieve a desired efficiency. However, in ocean environments the wave frequency spectrum is complicated, and the dominant frequency component changes day by day. That poses a tremendous challenge to the WEC design: a WEC with a fixed resonant frequency promises a relatively simple (thus robust and low-cost) structure, but it responds well to a very narrow band of the wave frequency only; whereas a WEC with a tunable resonant frequency leads to a much sophisticated (thus vulnerable and high-cost) structure, although the WEC's wave-frequency response range can be broadened to a certain extent.

In contrast to the reciprocating WEC class, there is a unidirectional WEC class. Unidirectional WECs perform unidirectional rotation that is directly driven by waves. Therefore, they do not use the resonance principle to improve the efficiency and, thus, have no need for frequency tuning. This frequency tolerance promises simple WEC designs to work efficiently in a very broad wave-frequency range. The unidirectional WEC class can be further divided into a horizontal axis group and a vertical axis group.

A horizontal axis unidirectional WEC features a rotary axis/shaft that is horizontally oriented. Examples of this type include a Savonius WEC (Faizal et al, 2009, Renewable Energy, 35, 164-169), a variation from the Savonius WEC (U.S. Pat. No. 8,206,113 B2), and a cycloidal WEC (U.S. Pat. No. 8,100,650 B2). Generally, a horizontal axis WEC prefers orthogonal alignment of the shaft with respect to the wave propagation direction for the best efficiency. In other words, the WEC shaft needs to be along the wave crest direction. When the wave direction changes, the WEC is expected to realign itself accordingly. However, realizing such realignment through a natural passive control (by means of hydrodynamic design) is difficult for this type of WECs, but a forced active control drastically complicates the WEC design.

The realignment becomes needless for vertical axis unidirectional WECs, which have their rotary shafts vertically oriented. For a successful vertical axis unidirectional WEC design, waves in any propagation directions work the same way in driving the WEC for a unidirectional rotary motion. One example of this type is Wave Rotor (WO2010011133 A1). It rotates well in simple waves but stops in irregular waves, according to its developer. Another example is published in patent application (WO2012166063 A1). In the only drawing of this application, the WEC—a vertical axis water turbine—was simply illustrated by a rectangle. In the description nothing on the structure or working principle of this turbine, which was supposed to be the core technology, has ever been provided at all.

Overall and in principle, the vertical axis unidirectional WECs have no need for either frequency tuning or realignment to cope with constantly changing wave conditions for high efficiency. Therefore, this WEC group has a great potential to result in very simple WEC designs that do not rely on any information or intervention from weather forecasting, sensing, electrical and/or mechanical control, etc. In harsh ocean environments, simplicity leads to robustness and guarantees low capital, operation and maintenance costs. There remains a need for additional methods and apparatus for vertical axis unidirectional WECs.

SUMMARY

Certain embodiments are directed to a unidirectional rotor for wave energy conversion. In certain embodiments the rotor is a vertical axis unidirectional rotor. In one embodiment, the rotor comprises a plurality of blades (e.g., lift-type blades) and a vertical shaft. In certain aspects the blades are lift-type or drag-type. The rotor is configured for unidirectional rotation about its shaft in both simple and irregular waves. The entire rotor can be made in one solid piece (i.e., monolithic construction) with no tuning and/or control needs. It can be easily integrated with different types of power take-off systems and supporting platforms. In a further aspect, the rotor can be directly or indirectly coupled to an electric generator. The electric generator can be mounted to a submerged platform. The submerged platform can be a fixed or floating platform. In certain aspects a system can be simple and dumb for unconditionally producing electricity at low cost.

Certain embodiments are directed to a vertical axis unidirectional WEC apparatus. The vertical axis unidirectional WEC apparatus can comprise a vertical axis unidirectional rotor having a plurality of rotor blades configured to rotate a rotor shaft in a predetermined direction, i.e. unidirectionally rotate the shaft. In certain aspects the rotor shaft can be unidirectionally rotated by fluid interacting with the rotor blades configured to exert a unidirectional torque on the rotor shaft. Water motion perpendicular to the rotor shaft, parallel to the rotor shaft, or in any oblique angles to the rotor shaft drives the rotor shaft in a predetermined direction of rotation.

In one embodiment, the rotor comprises a plurality of spatially distributed blades. The blades can be spatially distributed circumferentially about the rotor shaft, distributed vertically along the rotor shaft, or distributed both circumferentially and vertically along the rotor shaft. In certain aspects 1, 2, 3 or more blades are circumferentially distributed about the rotor shaft. In a further aspect 2, 3, 4, 5 or more blades are vertically distributed along the rotor shaft.

In certain embodiments one or more blades can be a drag-type blade having a cup-like shape. A cup-like blade can be a hemispherical shell or its oblong variations. The shell comprises a circular or elliptical convex wall having an outer surface and an inner surface, wherein the outer surface is a rounded convex shape and the inner surface is concave in shape. In certain aspects the wall thickness of the cup-like blade can vary along the arc of the wall.

In certain embodiments one or more blades can be a lift-type blade having a fish-like shape. In a longitudinal symmetrical plane the blade shows an airfoil (hydrofoil) shape. In a cross-sectional plane normal to the longitudinal centerline of the blade, the blade is in a circular or elliptical shape.

In certain embodiments one or more blades can be a lift-type blade in a wing shape. The blade has a first axis that is parallel to the leading edge of the blade, a second axis perpendicular to the first axis and parallel to the width of the blade as measured from leading edge to trailing edge. The first axis and the second axis forming the plane of the blade. In certain aspects the plane of the blade can be curved, up to 90° relative to the first axis, along the length as measured from the side proximal to the rotor shaft to the side distal to the rotor shaft. In certain aspects the plane of the blade is oriented parallel, perpendicular or in various combinations relative to the long axis of the rotor shaft. The blade has a hydrofoil-shaped cross-section perpendicular to the plane of the blade. In certain aspects the blade can be straight or bent along its span, and the chord length of the hydrofoil cross-section can vary along the span.

In certain embodiments, the apparatus can comprise a plurality of both lift-type and drag-type blades spatially distributed in any combination.

In certain aspects a blade is connected to the rotor shaft by a blade arm or spoke. In certain aspects the blade arm or spoke is a rod.

The vertical axis unidirectional rotor is configured for unidirectional rotation about its rotor shaft in both simple waves (swells) and irregular waves (seas). The rotor can be easily adapted to different types of power take-off systems that can be housed in different types of supporting platforms. An easy and straightforward scheme for power take-off is to let the rotor directly drive an electric generator. In one example, a submerged, floating platform with slack mooring provides a simple base support to arrays of WECs comprising a rotor as described herein.

Other embodiments are directed to a wave energy converter (WEC) comprising a vertical axis unidirectional rotor as described herein. Further embodiments are directed to an energy absorption unit arranged to absorb energy generated by fluid movement. The energy absorption unit comprising a plurality of WECs comprising a vertical axis unidirectional rotor as described herein. In certain aspects the energy absorption unit can further comprise a power generation unit connected to wave energy converter described herein. The energy absorption unit can also comprise an energy accumulation or storage unit. In certain aspects the energy absorption unit is configured as a floating body having a vertical axis unidirectional rotor positioned in the fluid. In certain aspect the floating body is submerged.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Embodiments of the present invention are described with reference to the above drawings. The description and drawings provide principles and exemplary embodiments to one of ordinary skills in the art to make and use the invention with possible modifications; they should not be taken as a scope limitation of the invention.

In ocean waves, water motion is complicated. Using simple waves in deep water as an example, water particles perform circular motion in vertical planes with a horizontal drift, and the radii of the circular orbits decrease exponentially with increasing water depth. Irregular waves complicate the water flow even more due to the superposition of different wave frequency components traveling in different directions. As a result, wave-caused water motion can be in any spatial direction that is constantly changing. In other words, the water flow in waves is omnidirectional. Using such omnidirectional water flow to drive a vertical axis rotor for unidirectional rotation demands unconventional hydrodynamic designs of the rotor. FIGS. 1A, 1B, 1C, and 1D illustrate four unidirectional rotor designs that have been successfully validated through hydrodynamic testing in a wave flume.

Figure 1A:
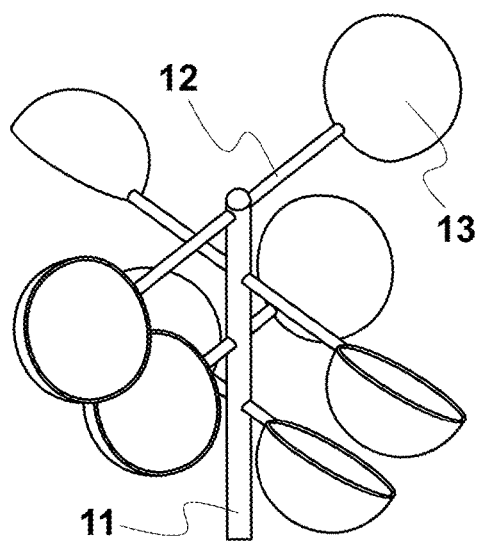
FIG. 1A-1D illustrate a vertical axis unidirectional rotor having drag-type blades (FIG. 1A), and lift-type blades (FIGS. 1B, 1C, and 1D) in accordance with embodiments of the invention.

As shown in FIG. 1A, the rotor comprises a plurality of drag-type cup-like blades 13 that are mounted to rotor shaft 11 through blade arms or spokes 12. The drag-type blades 13 can be in a hemispherical shell shape or its oblong variations. A blade's open end lies in a reference plane, which is herein defined as the base plane of the blade. In the rotor assembly in FIG. 1A, the inward-pointing normal vector of each blade's base plane forms a tilting angle with a horizontal reference plane. With no tilting, all the blades' open ends are vertically oriented, and all their base planes' inward-pointing normal vectors are in the same circular direction about the shaft 11 the expected unidirectional rotary direction of the rotor. Such blade arrangement promises the unidirectional rotation of the rotor in any horizontal water flows. With a tilting angle, some blades' open ends incline upwards from the vertical position, and the others downwards. The opposite tilting enhances the unidirectional responsiveness of the rotor in vertical water flows without jeopardizing much of its performance in horizontal flows. Also in FIG. 1A, the blades' radial and axial locations with respect to shaft 11 can be the same or different, depending on an optimized hydrodynamic design of the rotor.

Figure 1B:
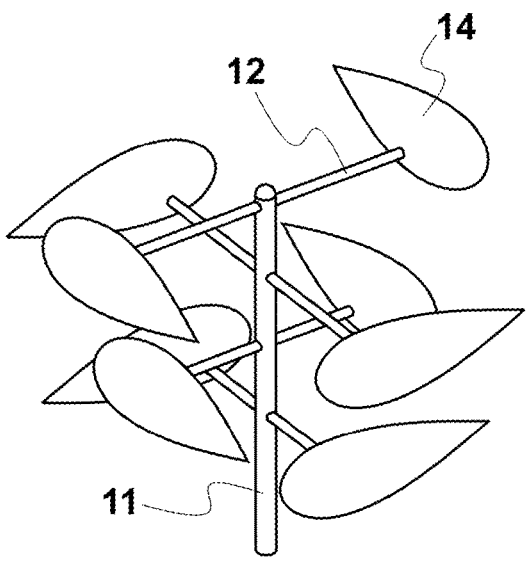

A lift-type rotor design is shown in FIG. 1B. In this design a plurality of fish-like blades 14 are mounted to a vertical shaft 11 through spokes 12. The longitudinal centerline of a blade 14 lies in a horizontal plane. This centerline can be straight or curved in the horizontal plane, and the profile of the blade in this horizontal plane is a hydrofoil. In any cross section normal to the centerline, the blade 14 is in a circular or elliptical shape. With the blunt end defined as the nose and the sharp end as the tail, all the blades are arranged in a way that their noses head to the same circular direction about the shaft 11 the expected unidirectional rotary direction of the rotor. A number of blades 14 can be placed in different radial and axial locations with respect to the shaft 11 to achieve an optimal hydrodynamic performance of the rotor.

Figure 1C:
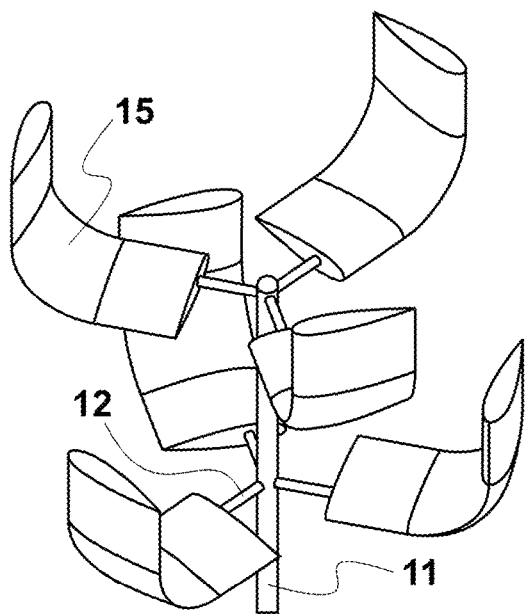

Another lift-type rotor design is shown in FIG. 1C. The rotor comprises a plurality of bent wing-shaped blades 15 that are mounted to a vertical rotor shaft 11 through spokes or blade arms 12. A blade 15 has an hydrofoil-shaped cross-section and a bent spanwise shape. The hydrofoil-shaped cross-section may or may not have changing dimensions along the span. The round edge of the blade is defined as the leading edge and the sharp edge as the trailing edge. A number of blades 15 can be place in different radial and axial locations with respect to the rotor shaft 11. All the blades 15 have their leading edges head towards the same circular direction about the vertical shaft 11. This circular direction defines the rotor's unidirectional rotary direction in waves. The spanwise bending of blades 15 enables the rotor to perform unidirectional rotation in any flow directions.

Figure 1D:
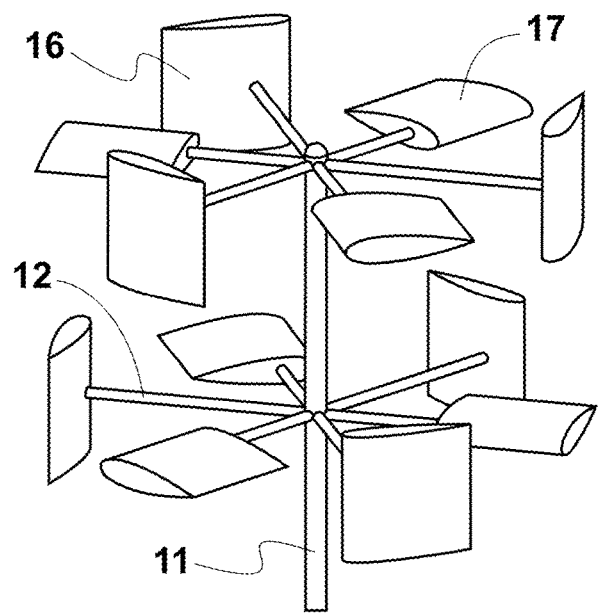

Yet another lift-type rotor design is illustrated in FIG. 1D. In this design, a plurality of straight lift-type blades 16 and 17 are mounted to the vertical rotor shaft 11 through spokes or blade arms 12. Both blades 16 and 17 have an hydrofoil-shaped cross-section and a straight spanwise shape. Blade 16 has its spanwise direction vertically oriented, and a blade 17 has its spanwise direction horizontally oriented. The hydrofoil-shaped cross-section of a blade may or may not have changing dimensions along the span. With the blunt edge defined as the leading edge and the sharp edge as the trailing edge, blades 16 and 17 are arranged in a way that their leading edges head to the same circular direction about shaft 11 the expected unidirectional rotary direction of the rotor. A number of blades 16 and 17 can be placed in different radial and axial locations with respect to the shaft 11 to achieve an optimal hydrodynamic performance of the rotor.

All the four rotor types in FIG. 1A through 1D have been tested in a wave flume, and unidirectional rotation of the rotors under various wave conditions have been observed.

Figure 15:
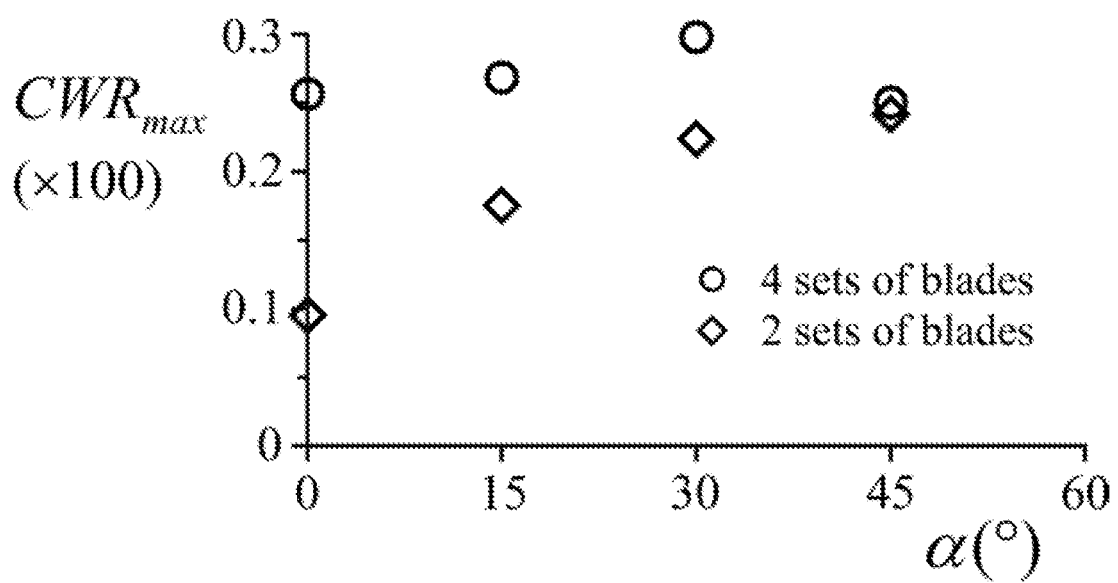
FIG. 15 Variation of the maximum capture width ratio $CWR_{max}$ with the blade angle a for the advanced rotor. Other parameters are: $f_W$=0.593 Hz, d/D=0.25, S/D=0.33.
Figure 16:
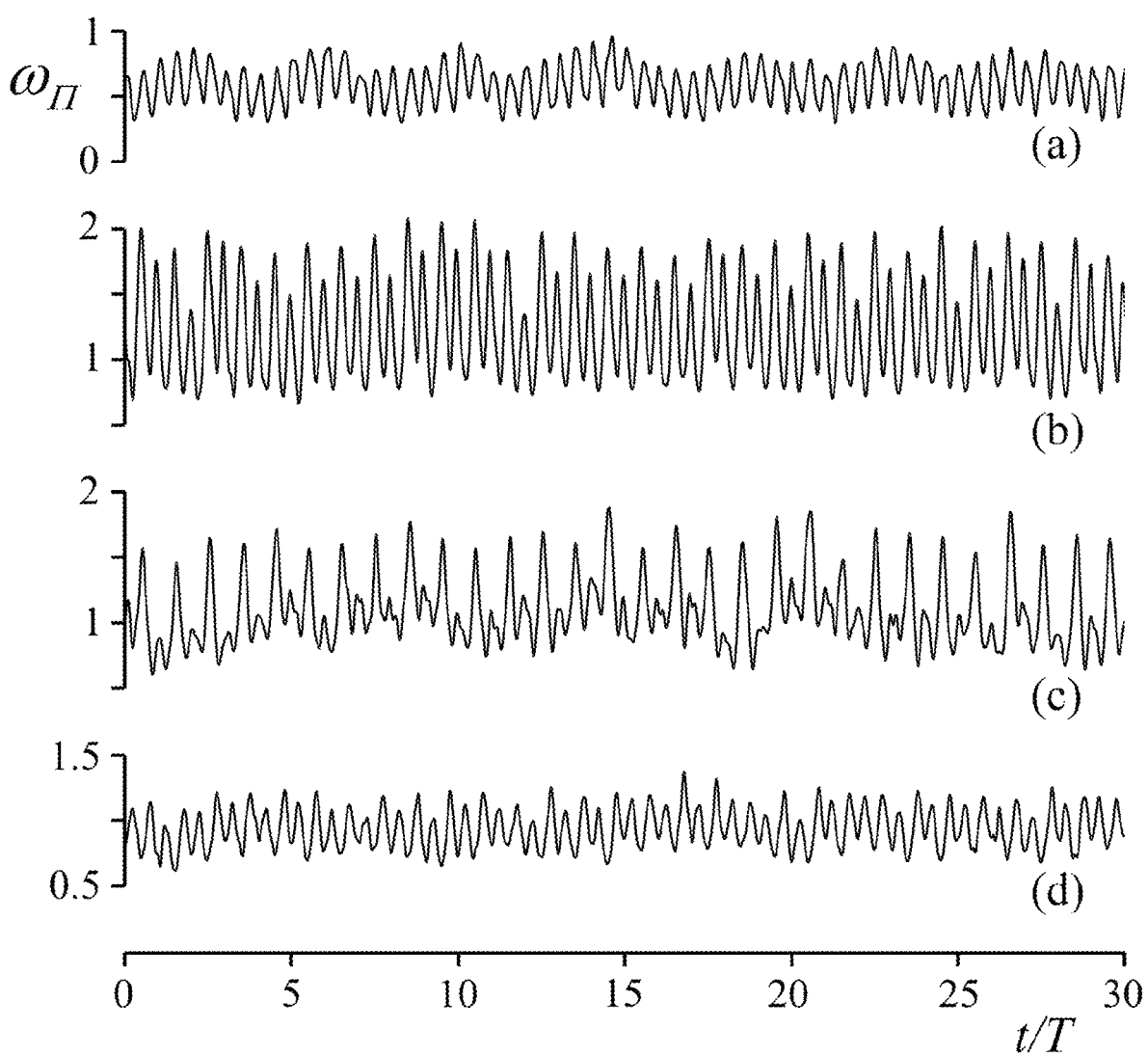
FIG. 16. Time traces of the normalized angular velocity $\omega_\Pi$ within 30 periods (T) for four cases: (a) horizontal oscillation of the rotor, (b) vertical oscillation of the rotor, (c) orbital translation of the rotor along a circular path, and (d) the rotor in waves. For (a) through (c), H=216 mm, f=0.75 Hz (T=1.33 s). For (d) H=223 mm, f=0.593 Hz (T=1.69 s).
Figure 17:
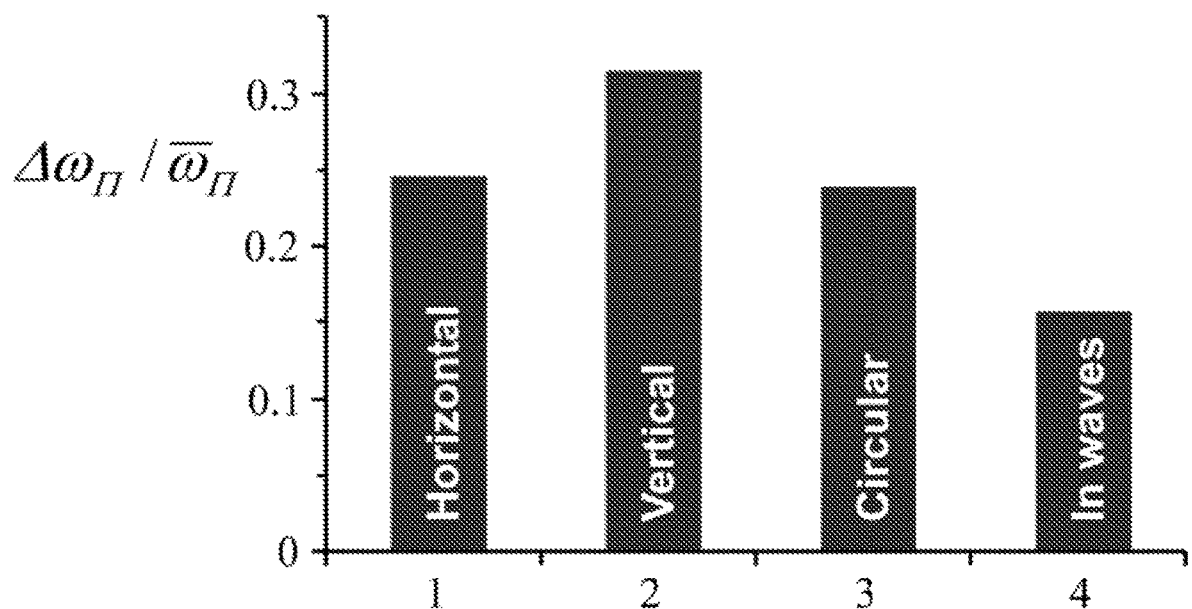
FIG. 17. Comparison of the relative fluctuation of the angular velocity among the four cases in FIG. 16.

Lift-type blades 14 in FIG. 1B, 15 in FIGS. 1C, 16 and 17 in FIG. 1D and drag-type blades 13 in FIG. 1A can be used to configure a hybrid rotor (not shown). Like the other four rotors in FIGS. 1A, 1B, 1C and 1D, the vertical axis hybrid rotor also performs unidirectional rotation in waves. In fact, all the four rotors as illustrated in FIGS. 1A, 1B, 1C and 1D as well as the hybrid rotor perform unidirectional rotation in waves regardless of the shaft orientation vertical, horizontal, or oblique. But they are herein intended for a vertical orientation, which allows a simpler system design for better efficiency as discussed below.

Figure 2:
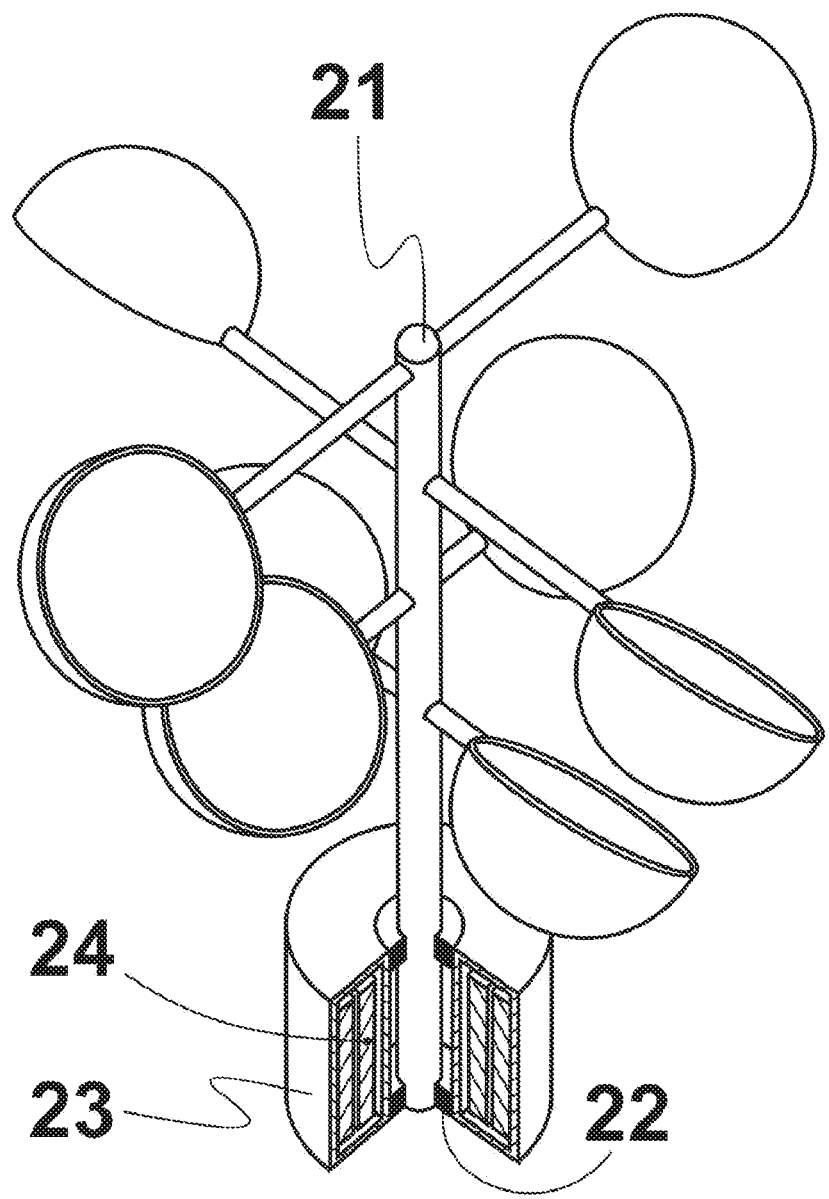
FIG. 2 schematically illustrates an assembly of a vertical axis unidirectional rotor in FIG. 1A with a direct-drive electric generator to form a vertical axis unidirectional WEC in accordance with the invention.

Upon hydrodynamic optimization, a vertical axis unidirectional rotor as described herein (e.g., FIG. 1A, 1B, 1C, or 1D) can be fabricated and assembled as a single solid piece; no tuning or real-time control is needed. The rotor can then be connected to a variety of power take-off systems for energy extraction. FIG. 2 shows a very simple and straightforward power take-off scheme: vertical axis unidirectional rotor 21 is integrated with direct-drive electric generator 24 via bearings 22 and generator casing 23. The rotor in FIG. 1A is chosen as a non-limiting example for illustrating integration; the rotors in FIGS. 1B, 1C and 1D as well as variations thereof can also be used. In FIG. 2, the central path of the annularly shaped casing 23 accommodates the two bearings 22 and the shaft of the rotor 21. In this illustration generator 24 is solidly encapsulated inside the watertight annular casing 23, and rotor shaft 21 does not penetrate through the wall of casing 23 to reach generator 24. This way, water does not leak into casing 23. Torque transfer between rotor shaft 21 and generator 24 (specifically, the rotor of the generator, not specified in FIG. 2) is done through non-contact magnetic coupling by means of permanent magnets (not shown) properly embedded in rotor shaft 21 and generator 24; these magnets are not for generating electricity. Similar torque transfer mechanisms have been used in submersible pump designs, such as fountain pumps and sump pumps. Generator 24 can be a direct-drive electric generator. The direct-drive electric generator works efficiently at low RPM. Generators of this type have been developed in recent years for gearless wind turbines.

Figure 3:
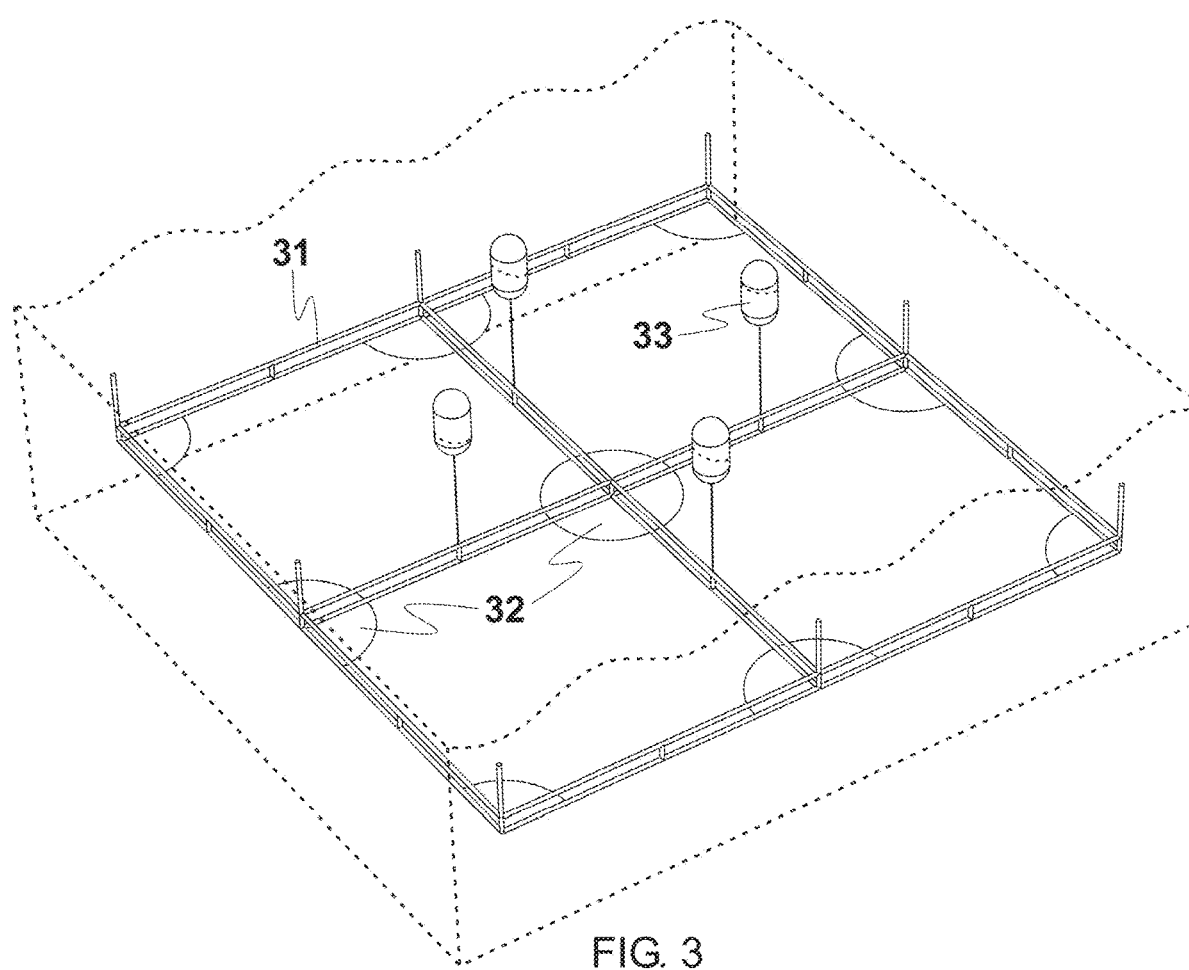
FIG. 3 schematically illustrates a submerged yet floating platform in accordance with the invention.
Figure 4:
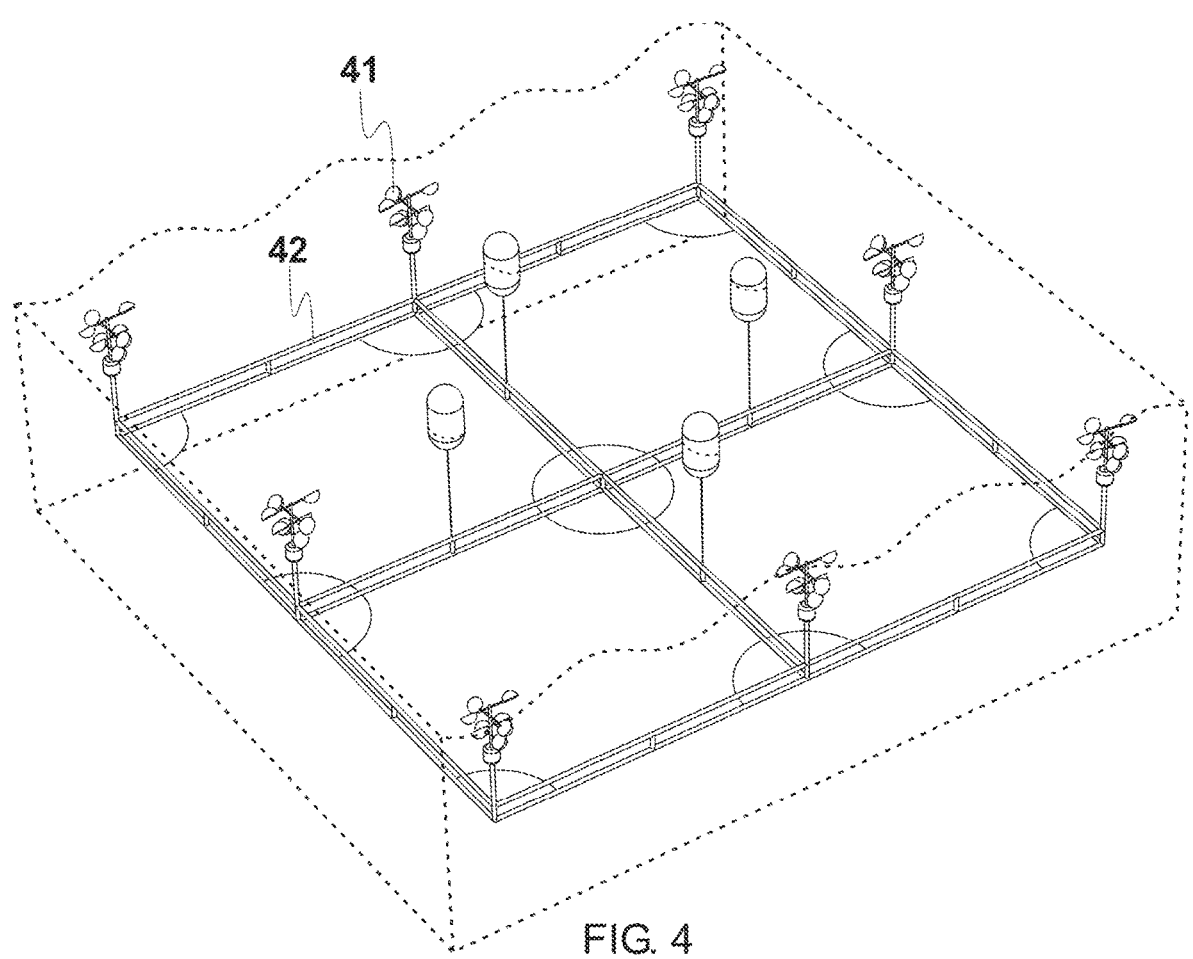
FIG. 4 schematically illustrates arrays of vertical axis unidirectional WECs in FIG. 2 mounted to the platform in FIG. 3.

Upon assembly of the vertical axis unidirectional rotor with a power take-off system, which is not limited to the abovementioned example, the formed vertical axis unidirectional WEC needs to be mounted to a platform for ocean deployment. The platform can be seabed based, submerged, or surface floating. An offshore wind turbine can also serve this purpose well. A selected platform needs to be relatively stable in waves and can maintain the vertical axis unidirectional WECs submerged in water but close to the free surface. An exemplary submerged-yet-floating platform design for easy deployment is illustrated in FIG. 3. It comprises a submerged base 31 and buoys 33; stabilizers 32 are integrated parts of the base 31. The platform can be naturally stabilized to a satisfactory level in waves due to its configuration, size, and a proper submersion level. The submersion also greatly reduces the platform's interference to waves. Slack mooring (not shown) can be employed to stop the platform from drifting. The platform can provide a base support for arrays of the vertical axis unidirectional WECs described herein and demonstrated in FIG. 4. With a proper arrangement of WECs 41, reactive loadings from individual WECs can be nearly (if not all) balanced on platform 42.

EXAMPLES

The following examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

A. Methods

Experimental Setups and Parameter Ranges.

All the experiments were conducted in a wave flume of inner dimensions 15 m long by 1 m wide by 1.3 m high. The water depth was kept at 1 m. Two small-scale model rotors were explored in this study a basic rotor and an advanced rotor. Both rotor types employed identical hemispherical shells as blades; these blades are herein referred to as cup blades. Each rotor type always had its shaft vertically oriented in waves.

The basic rotor consists of two sets of dual blades mounted to a shaft through spokes at two axial locations. The distance between the two axial locations is defined as the spacing S, which can be varied by axial sliding along the shaft. At each axial location, the two spokes (forming one pair) are coaxial. Between the two axial locations, the two pairs of spokes are orthogonal. The blade angle α is defined as the angle between a vertical plane and a blade's open-end plane. Each pair of blades connected via two coaxial spokes always have opposite open-end facing. Two diameters are defined: the blade diameter d (cup diameter) and the rotor diameter D (the diameter of the rotor swept area). The rotor diameter D can be varied by sliding cup blades along spokes. The basic rotor was mounted to a support through a shaft-bearing-casing assembly. The assembly allowed free rotation of the rotor about the shaft at a low friction. The low friction is quantified in terms of resistant torque. The rotor shaft can slide through the support for easy adjustment of the rotor's submersion level in water.

For parametric study of the basic rotor, a group of parameters were explored in certain ranges. On wave conditions, a fixed wave height (H) and two wave frequencies ($f_W$) were chosen; they were H=0.223 m and $f_W$=0.593 Hz and 0.392 Hz, respectively. On rotor parameters, specifications are as follows: D=304.8 mm, 279.4 mm, 254 mm, 228.6 mm, and 203.2 mm; d=76.2 mm (wall thickness 0.4 mm); S=25.4 mm, 50.8 mm, 101.6 mm, and 152.4 mm; and α=0°, 15°, 30°, 45°, 60°, 75°, and 90°. These rotor parameters except for α are presented in dimensionless forms. For all the experiments, the rotor submersion was maintained at the same level: the centerline of the top two spokes was 133 mm beneath the free surface in still water.

The advanced rotor was configured somewhat differently from the basic rotor. The advanced rotor consists of multiple sets of quadruple blades along the shaft, with each set having four cup blades evenly distributed circumferentially at a given axial location. Between two neighboring sets, there is an angular difference of 45° along the shaft direction. The two diameters d and D as well as the blade angle α and the open-end facing are defined the same as for the basic rotor. The spacing S is the axial distance between two neighboring rotor sets, and the rotor length L is an axial measure between the highest point of a top blade and the lowest point of a bottom blade (e.g., for a rotor having 4 sets of quadruple blades, L=3S+d).

The support system for the advanced rotor was also different from that for the basic rotor. Specifically, a power take-off simulator was added to a shaft-bearing-casing assembly. The power take-off simulator employed two discs in contact. One disc was fastened to the fixed casing and the other to the rotating shaft. Different friction levels between the two discs were achieved by evenly compressing three springs. The relationship between the spring compression distance and the yielded resistant torque was then obtained through calibration. Adjustable resistant torque is important for rotor characterization at different power extraction levels.

In testing the advanced rotor, the same wave height as for the basic rotor was employed; it was H=0.223 m. Only one wave frequency $f_W$=0.593 Hz was employed. The rotor parameters or parameter ranges are: D=304.8 mm; d=76.2 mm; S=25.4 mm, 50.8 mm, 76.2 mm, 101.6 mm, 152.4 mm, and 304.8 mm; and α=0°, 15°, 30°, 45°, and 60°. Note that a change in the blade spacing S results in a change in the rotor length L. During experiments the number of blade sets was varied between 1 and 4. Different levels of the resistant torque were also employed, as specified in a dimensionless form. The rotor submersion levels for all the testing cases were maintained the same: the plane formed by centerlines of the top set of quadruple spokes is 133 mm beneath the free surface in still water.

Data Acquisition and Processing.

For data acquisition, the main purpose was to obtain time traces of a rotor's angular velocity. Based on such data, statistic characterization of the angular velocity and the rotor's power extraction can be further determined. Serving this purpose, a dial was fixed to the rotor shaft from the top end for each rotor being tested. The dial always rotated together with the rotor. An iPhone 6 Plus was employed to videotape the rotating dial against a fixed reference line in slow motion mode (framing rate 240 fps). For each experimental run, the recording time was approximately 60 s. The videos were then manually processed frame by frame to extract time traces of the angular displacement at a sampling rate of 30 samples per second. In the next step, the corresponding angular velocity was derived by means of finite difference at the same sampling rate, which resulted in a Nyquist frequency of 15 Hz. The interested frequency range for the present research is below 1.2 Hz. In producing time traces of the angular velocity, a low-pass filter with a cut-off frequency of 4 Hz was applied.

In analyzing experimental results, most parameters were presented in dimensionless forms. The rotor diameter D was employed as the characteristic length to normalize the blade diameter d, spacing S, and rotor length L; the yielded dimensionless forms were d/D, S/D, and L/D, respectively. A rotor's instantaneous angular velocity ω was normalized as $$\omega_\Pi = D\omega/2\pi f_W H \tag{1}$$

It represents the ratio of two tangential speeds: one is the rotor's tip speed, and the other is the free-surface water speed along a circular orbit in deep waves. The mean angular velocity $\bar{\omega}$ and the fluctuation magnitude Δω were normalized in exactly the same way; they were denoted as $\bar{\omega}_\Pi$ and $\Delta\omega_\Pi$ upon normalization.

To simulate power extraction by a rotor from waves, a power take-off simulator by means of mechanical friction was employed in the advanced rotor. The friction generated a resistant torque about the rotor shaft against the wave-driven rotation of the advanced rotor. This resistant torque Γ was normalized as $$\Gamma_\Pi = \frac{64\pi^2 f_W^2 \Gamma}{\rho g^2 H D^2} \tag{2}$$

where ρ is the water density and g the gravitational acceleration. It was derived by normalizing the resistant torque Γ with a characteristic resistant torque. The characteristic resistant torque was defined under two conditions: (i) with the characteristic resistant torque applied on the rotor, in simple deep waves without drift motion the rotor's average tip speed is the same as the wave-driven water speed in circular motion at the free surface and, (ii) the wave power carried by the incoming deep waves in a width that is equal to the rotor diameter D is fully extracted by the rotor at the defined average tip speed and characteristic resistant torque in (i).

The averaged power $\bar{P}$ generated by the advanced rotor was determined using $\bar{P}=\bar{\omega}\Gamma$. The non-dimensional power $\bar{P}_\Pi$ can be directly derived using $$\bar{P}_\Pi = \bar{\omega}_\Pi \Gamma_\Pi \tag{3}$$

In fact, this $\bar{P}_\Pi$ precisely represents the rotor's capture width ratio CWR in simple deep waves:

$$CWR = \bar{P}_\Pi = \frac{32\pi f_W \bar{P}}{\rho g^2 H^2 D} \tag{4}$$

B. Conceptual Development

In realizing a vertical-axis rotor for unidirectional rotation in waves, the basic rotor was constructed and used in the initial proof-of-concept study. According to the parameter definition with S=0 and α=0°, the rotor resembles a typical cup anemometer used in weather stations. From aerodynamic study of cup anemometers, it has long been known that horizontal winds in any direction always drive the rotor for unidirectional rotation (Pindado et al., *The Scientific World Journal*, Article ID 197325, 2013). In water, there is no doubt that the rotor responds in exactly the same way to horizontal steady flows in any direction. In water waves, however, water motion is much more complicated. Using simple waves in deep water as an example, water particles perform circular motion in vertical planes with a horizontal drift, and the radii of the circular orbits decrease exponentially with increasing water depth (Pickard and Pond, Introductory Dynamical Oceanography, 2nd ed, Oxford: Elsevier Butterworth-Heinemann, 1983). Irregular waves will complicate the water flow even more due to the superposition of different wave frequency components traveling in different directions. As a result, wave-caused water flow can be in any spatial direction that is continuously changing. In other words, the water flow in waves is omnidirectional. Then the question is: can such an omnidirectional flow drive the rotor for unidirectional rotation?

To answer this fundamental question and guide the conceptual development of the rotor, an omnidirectional flow is first decomposed into a horizontal component and a vertical component. Then the rotor interaction with each component flow is analyzed. Note that the rotor interaction with an omnidirectional flow is highly nonlinear. Therefore, the decomposition is a very rough approach, just to gain basic understanding.

For the horizontal flow component that may have a continuously changing horizontal direction (in a 360°-range) and magnitude, it can be discretized in the temporal domain. At each moment, the flow can be roughly treated as a steady horizontal flow in one direction. The quasi-stationary approximation neglects the flow acceleration effect. Cup anemometer aerodynamics has proven that such a flow always drives the rotor to rotate in one direction regardless of the flow approaching directions. The continuously changing horizontal flow (in both the velocity magnitude and direction) should be able to maintain the rotor's rotation in this particular direction.

The vertical flow component is a bidirectional (up and down) axial flow to the rotor. In the rotor design, the asymmetrical blade layout is expected to yield a unidirectional rotation in bidirectional axial flows as a Wells' rotor does (Raghunathan, *Progress in Aerospace Sciences*, 31:335-386, 1995). Such a unidirectional rotation should be in the same direction with the one generated by horizontal flows. An added blade angle α (from 0°) is intended to increase such effect without jeopardizing the rotor's unidirectional performance in horizontal flows.

Assume that the above discussion on the rotor's unidirectional capability in the two component flows is all true. Then very likely the rotor would perform unidirectional rotation in omnidirectional flows, or more specifically, in waves. All these expectations have been experimentally validated.

Preliminary studies in still water were carried out for proof-of-concept validation. The whole experimental setup, including the rotor model and the support, was carried by a person to realize a manually operated translation of the rotor in still water. While the translation could be along any arbitrary paths, the rotor shaft was maintained as vertical as possible all the time. Three types of the rotor translation were performed: horizontal oscillation, vertical oscillation, and improvising arbitrary 3-D oscillation. With a fixed rotor diameter D=304.8 mm and blade spacing S=25.4 mm, two blade angles α=0° and 45° were examined for each type of the rotor translation.

Direct experimental observation evidenced that, in each and every case mentioned above, the rotor very profoundly performed unidirectional rotation all the time. More interestingly, the improvising arbitrary 3-D oscillation of the rotor in still water could closely mimic a fixed rotor in irregular waves if the rotor size is small enough compared to the dominant wave length. Considering that a WEC equipped with such a rotor belongs to the point absorber class, meeting such a design criterion would not be a problem. Therefore, the rotor is capable of performing unidirectional rotation in irregular waves.

In addition to translating the basic rotor in still water, additional experiments have been conducted by exposing the basic rotor in simple waves. The rotor performed unidirectional rotation about the vertical axis in all the testing conditions.

C. Angular Velocity

With a vertical-axis rotor in waves, the driving flow is omnidirectional, yet the resulted rotor motion is unidirectional. Such a unidirectional feature is best represented by the rotor's angular velocity, essentially without change in sign. Upon validation of the proof of concept, both the basic rotor and advanced rotor were systematically characterized in simple waves under various conditions.

Characteristics of the Basic Rotor.

To gain preliminary understanding on the rotor's unidirectional responsiveness in waves, the basic rotor was tested first in simple waves. For all the tests, the wave height was fixed at H=0.223 m. Two wave frequencies were employed, $f_W$=0.593 Hz and 0.392 Hz. The mechanical friction from two ball bearings, which were used to connect the rotor shaft to a support, generated a low-level resistant torque Γ=0.007 N m, which remained nearly constant in all the tests on the basic rotor. The normalized resistant torque at $f_W$=0.593 Hz and D=304.8 mm is $Γ_Π$=0.0008.

Figure 5:
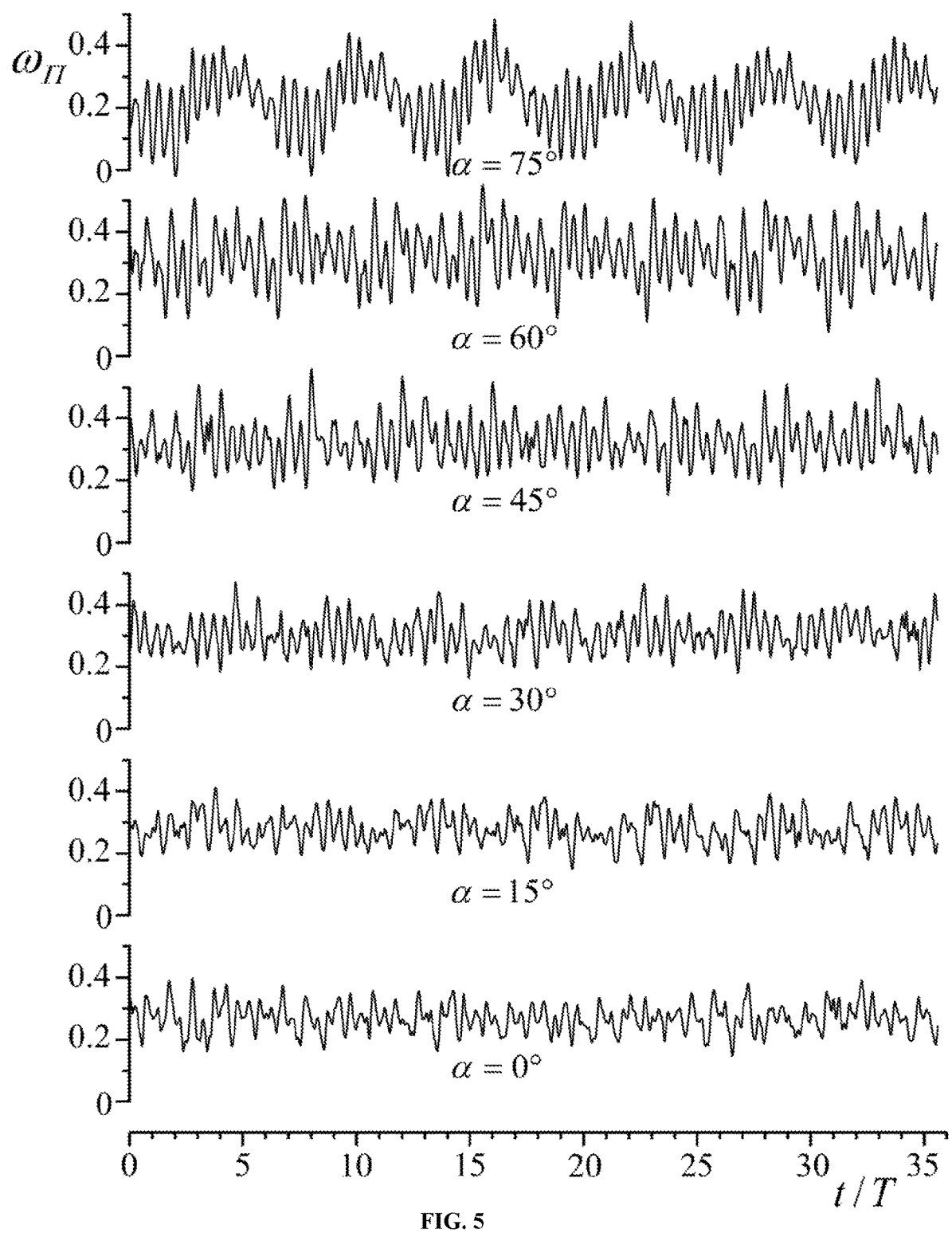
FIG. 5 Time traces of the angular velocity $\omega_\Pi$ at various angle $\alpha$ for the basic rotor. The wave and rotor conditions are: $f_W$=0.593 Hz, d/D=0.25, S/D=0.083.

FIG. 5 illustrates some typical time traces of the rotor's angular velocity $ω_Π$ at a wave frequency $f_W$=0.593 Hz. The time t was normalized by the wave period T=1/$f_W$. By fixing all the other parameters and varying α only, the time traces show some common features. First of all, unidirectional rotation was achieved in all the cases; no reverse rotation was ever observed. Secondly, while being unidirectional, $ω_Π$ did fluctuate in certain ranges and patterns. The fluctuation behavior of the angular velocities in FIG. 5 is better presented in FIG. 6 in terms of the amplitude spectra. Evidently, the dominant fluctuation frequency is at f=2$f_W$ for nearly all the cases, and a much less dominant one is at f=$f_W$. These two fluctuation components are directly related to the wave motion. For the intuitive basic rotor design without any optimization, although a flow in any direction pushes the rotor for unidirectional rotation, the rotor does have a directional preference; it is the horizontal flow component. Therefore, the rotor's angular velocity goes relatively fast when the flow is along a horizontal direction, but becomes relatively slow when the flow changes to a vertical direction. The frequency doubling is due to double occurrences of a favorable flow (in opposite directions) within one wave period. The directional preference of the rotor can be minimized through design optimization.

In addition to the two frequencies mentioned above, there is a third peak in the spectra in the low frequency range, $$\frac{f}{f_W} = 0.17 \sim 0.25$$

Figure 6:
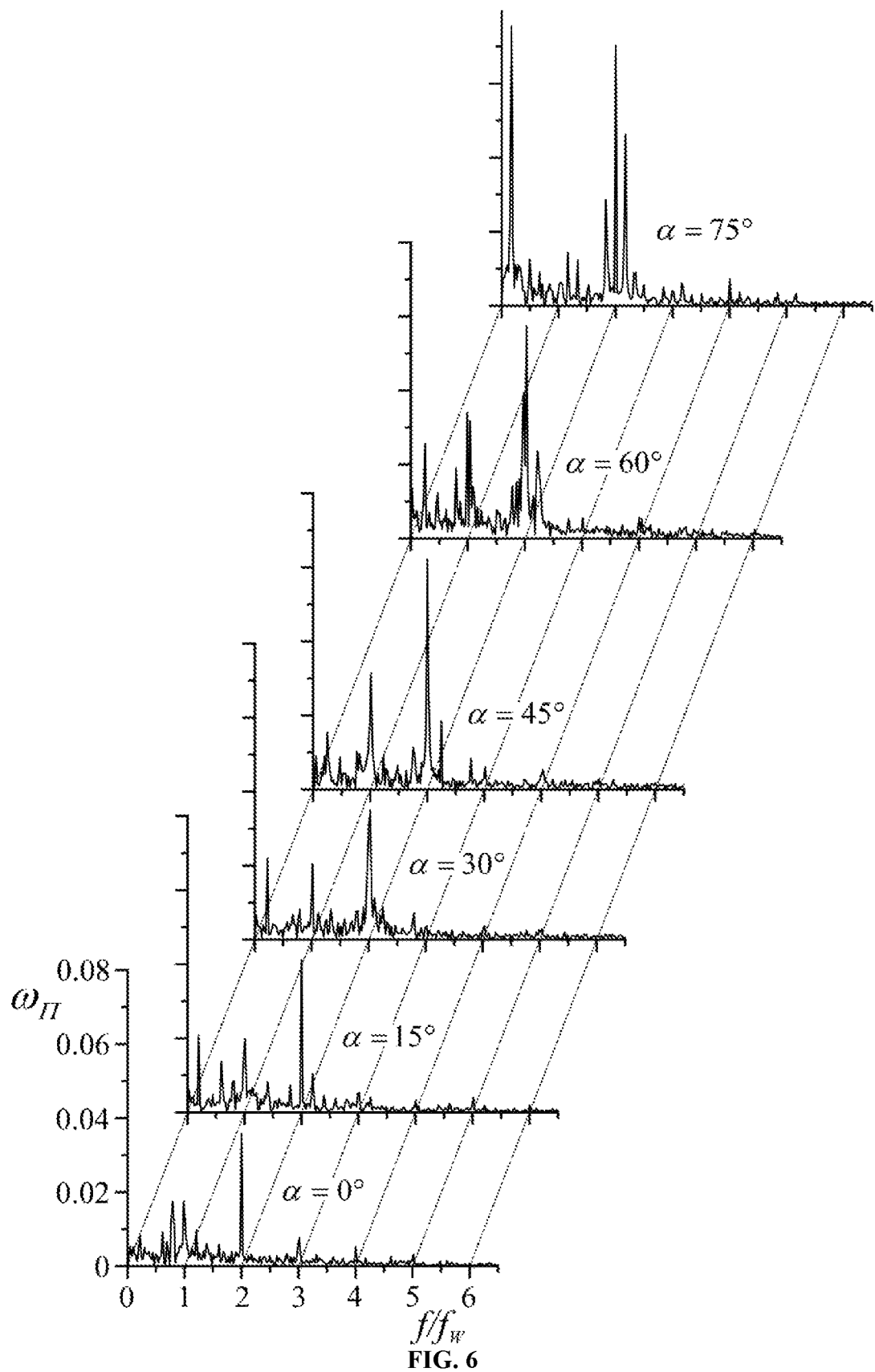
FIG. 6 Spectra of the angular velocity $\omega_\Pi$ for the time traces shown in FIG. 5.

(FIG. 6). This peak is hardly noticeable at $\alpha=0°$, but becomes profound at $\alpha=15°$, 30°, 45° and 60°. Especially, this peak becomes overly dominant at $\alpha=75°$. The fluctuation of the angular velocity at this frequency is attributed to the rotor's phase angle in relation to the wave's phase angle. When the two phase angles dynamically match up in a certain way, which obviously occurs periodically, the rotor's unidirectional rotation goes through acceleration-deceleration cycles in a period much longer than the wave period. Such a fluctuation pattern is very clear at $\alpha=60°$ and 75°, as shown in FIG. 5. It is noteworthy that at $\alpha=90°$, the rotor stops rotating. In this case, the rotor has two adjacent cups facing up and the other two facing down. Observation shows that, following an initial rotation the rotor reaches an equilibrium position—two adjacent cups of the same facing line up along the wave crest direction and result in torque cancelling.

Figure 7:
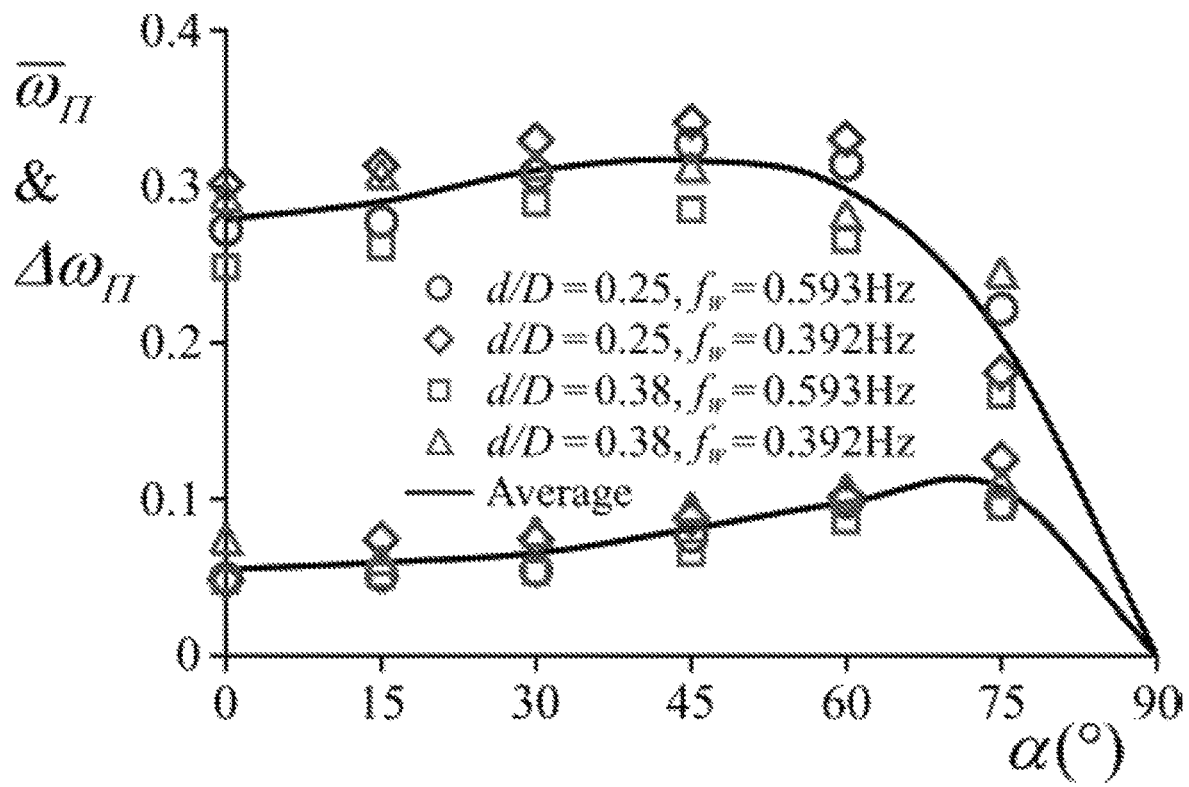
FIG. 7 Variation of the mean angular velocity $\overline{\omega}_\Pi$ and the fluctuation magnitude $\Delta\omega_\Pi$ with the blade angle $\alpha$ for the basic rotor. The upper symbols are for $\overline{\omega}_\Pi$ and the lower ones for $\Delta\omega_\Pi$. For all the cases, S/D=0.083.
Figure 8:
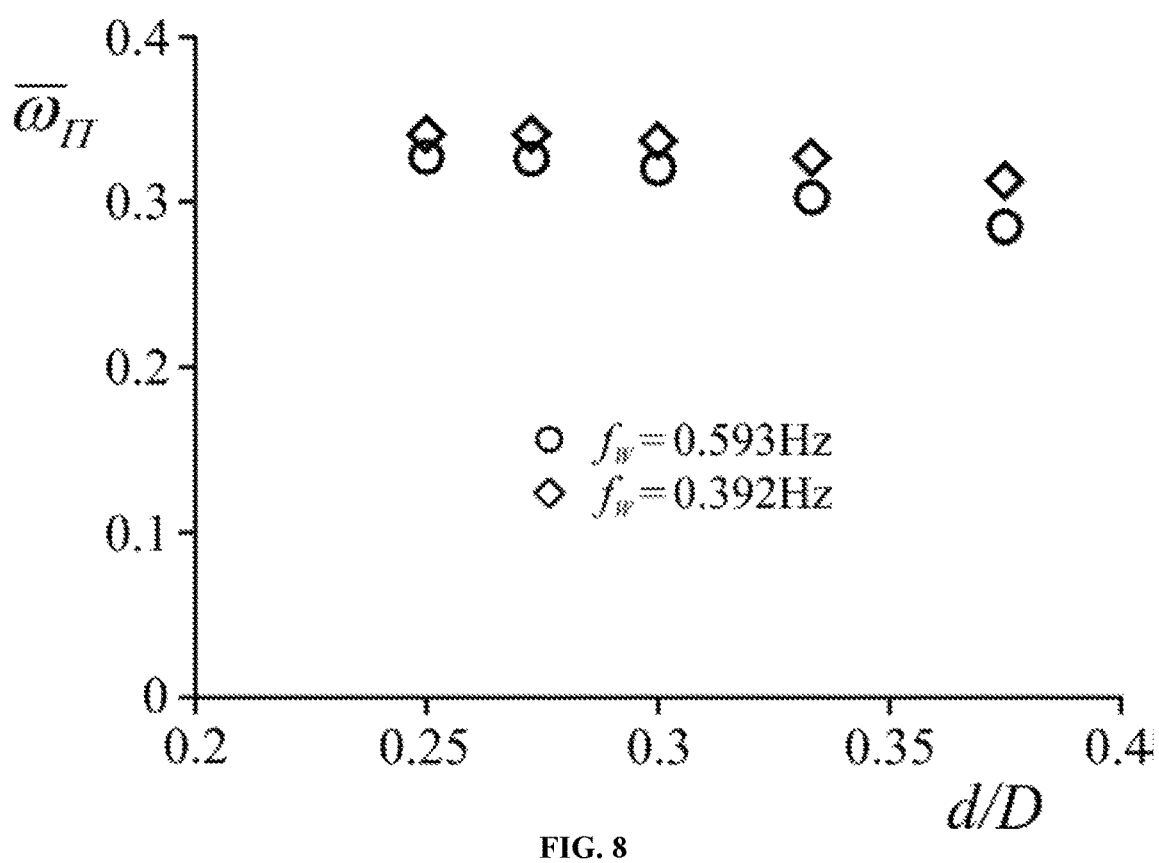
FIG. 8 Variation of the mean angular velocity $\overline{\omega}_\Pi$ with the normalized blade diameter d/D for the basic rotor. Other parameters are: S/D=0.083, $\alpha$=45°.
Figure 9:
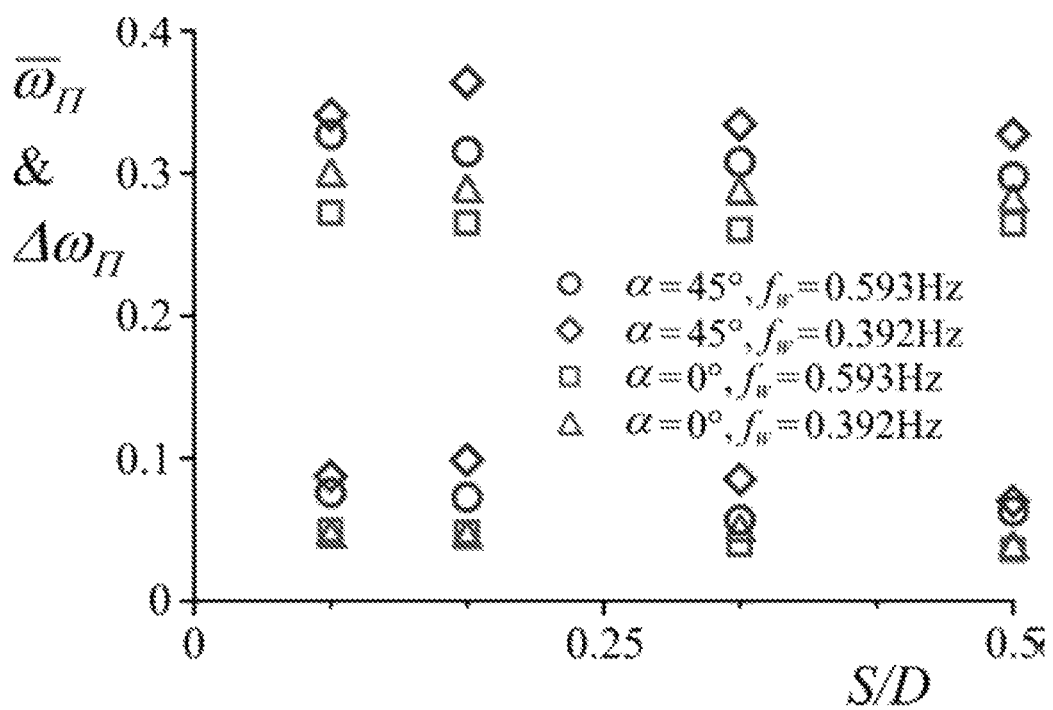
FIG. 9 Variation of the mean angular velocity $\overline{\omega}_\Pi$ and the fluctuation magnitude $\Delta\omega_\Pi$ with the normalized axial blade spacing S/D for the basic rotor. The upper symbols are for $\overline{\omega}_\Pi$ and the lower ones for $\Delta\omega_\Pi$. For all the cases, d/D=0.25.

In rotor characterization, the mean angular velocity is of importance, since it is related to the rotor's power extraction capability. FIGS. 7, 8, and 9 show the effects of $\alpha$, d/D, and S/D on the normalized mean angular velocity $\overline{\omega}_\Pi$ at two values of $f_W$. The corresponding values of the normalized velocity fluctuation $\Delta\omega_\Pi$, measured by the standard deviation, are also presented in FIGS. 7 and 9, respectively.

In FIG. 7 with focus on four parameter combinations, $\overline{\omega}_\Pi$ generally follows an ascending-to-descending trend with increasing $\alpha$ for each combination. But in the range $0°\leq\alpha\leq60°$, $\overline{\omega}_\Pi$ only goes through a very mild change, and $\overline{\omega}_\Pi$ differences among the four combinations are small. Such a pattern can be clearly seen from the relatively flat solid line with all the data points closely scattered around it. The solid line represents an average of $\overline{\omega}_\Pi$ for the four combinations. Beyond $\alpha=60°$, however, a quick drop of $\overline{\omega}_\Pi$ is observed. In contrast to $\overline{\omega}_\Pi$, $\Delta\omega_\Pi$ has much lower values in $0°\leq\alpha\leq60°$. Specifically, $\Delta\omega_\Pi$ takes 15 to 25% of $\overline{\omega}_\Pi$ only. It is noteworthy that $\Delta\omega_\Pi$ continuously increases with increasing $\alpha$ till $\alpha=75°$. For energy harvesting from ocean wave, one would expect the rotor to run fast with low fluctuation. The top solid line in FIG. 7 depicts a peak of $\overline{\omega}_\Pi$ at $\alpha=45°$, indicating that the rotor runs fastest at this $\alpha$. The associated fluctuation $\Delta\omega_\Pi$, however, is also relatively strong in comparison with other lower values of $\alpha$.

By taking a closer look at $\alpha=45°$, $\overline{\omega}_\Pi$~d/D relation is plotted in FIG. 8. Comparison between two values of $f_W$ is also made. In general, no remarkable change of $\overline{\omega}_\Pi$ is observed in the examined range of d/D. The difference of $\overline{\omega}_\Pi$ between the two values of $f_W$ is also very small. Yet, a nearly linear descending trend is clear.

The effect of the blade spacing S/D on $\overline{\omega}_\Pi$ and $\Delta\omega_\Pi$ are shown in FIG. 9. Four combinations of $\alpha$ and $f_W$ are compared in the range of $0.1\leq S/D\leq0.5$ at a fixed d/D. For the combination of $\alpha=45°$ and $f_W=0.392$ Hz, $\overline{\omega}_\Pi$ reaches a peak at S/D=0.2. For the other three combinations, however, $\overline{\omega}_\Pi$ descends monotonously. Overall, for all the combinations the change of S/D only causes a very mild change in $\overline{\omega}_\Pi$ (and $\Delta\omega_\Pi$). From hydrodynamics point of view, when all the blades/cups are placed in or near one rotary plane, interaction among the cups will reduce their individual contribution to the overall torque for rotation. An axial spacing S is intended to minimize their interaction for better efficiency. However, such an added spacing forces the bottom pair of the cups to be placed further down from the free surface. Since the water motion in waves decreases exponentially with the depth, the bottom pair was then exposed in a much weaker flow compared to a level closer to the surface. As a balance to a certain extent, the rotor responsiveness is not sensitive to S/D in the examined range. Such a feature is advantageous to the rotor design.

Characteristics of the Advanced Rotor.

To further examine the effects of the blade number, blade layout, and power take-off on the rotor's unidirectional performance, the advanced rotor in conjunction with the power take-off simulator was tested in waves. Only one wave frequency and one rotor diameter were examined on the advanced rotor; they were $f_W=0.593$ Hz and D=304.8 mm, respectively. Without the power take-off simulator, the mechanical friction generated by two roller bearings yielded a minimum resistant torque of $\Gamma_\Pi=0.002$. The power take-off simulator provides additional resistant torque according to needs.

Figure 10:
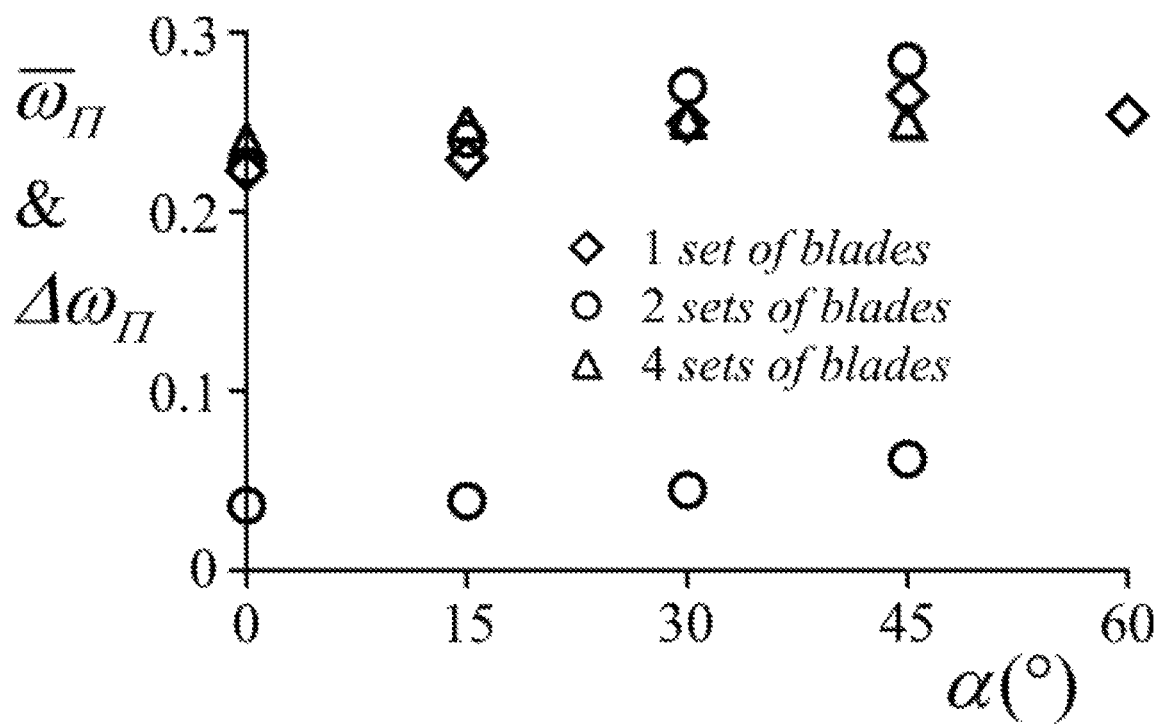
FIG. 10 Variation of the mean angular velocity $\overline{\omega}_\Pi$ and the fluctuation magnitude $\Delta\omega_\Pi$ with the blade angle $\alpha$ for the advanced rotor having different sets of blades and at the minimum resistant torque $\Gamma_\Pi$=0.002. The upper symbols are for $\overline{\omega}_\Pi$ and the lower ones for $\Delta\omega_\Pi$. Other parameters are: $f_W$=0.593 Hz, d/D=0.25, S/D=0.33.

At the minimum $\Gamma_\Pi$ and a fixed S/D, FIG. 10 shows the $\overline{\omega}_\Pi$~$\alpha$ relations (top) for the advanced rotor employing different numbers of blade sets and the $\Delta\omega_\Pi$~$\alpha$ relation (bottom) for the advanced rotor with two sets of blades. In general, the overall pattern resembles FIG. 7 for the basic rotor, but all the data points are at a somewhat lower level. This reduced level of $\overline{\omega}_\Pi$ and $\Delta\omega_\Pi$ is mainly due to the increase of the minimum $\Gamma_\Pi$ from 0.0008 (for the basic rotor, employed ball bearings) to 0.002 (for the advanced rotor, used roller bearings). In a close look, $\overline{\omega}_\Pi$ for two sets of blades increases faster with $\alpha$ than for four sets of blades in $0°\leq\alpha\leq45°$. But due to the overall mild change, all the three sets of data collapse into a narrow band. Therefore, at the minimum $\Gamma_\Pi$, the effect of the blade number on $\overline{\omega}_\Pi$ is trivial in the examined parameter ranges.

Figures 11A, 11B, 11C, 11D:
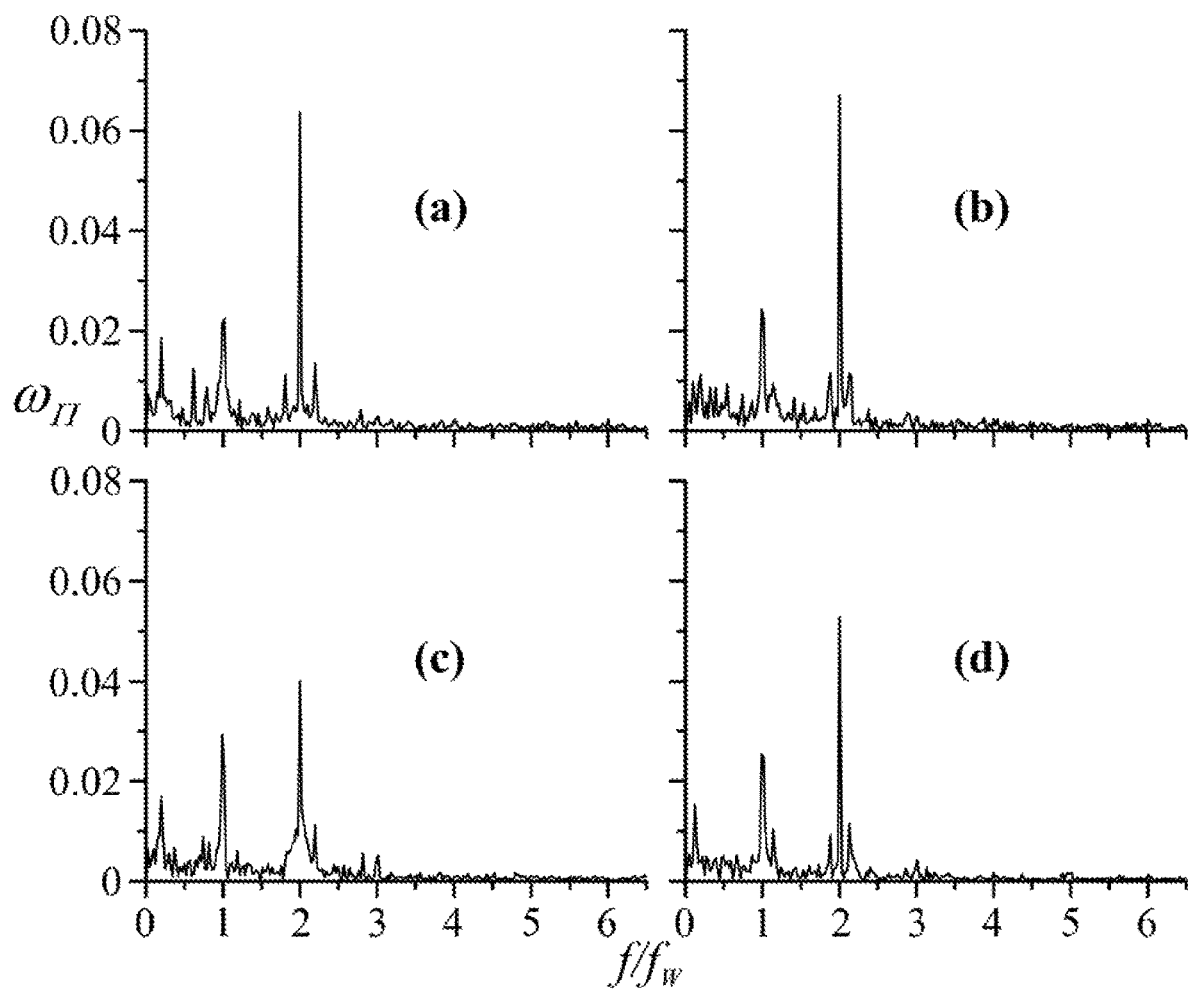
FIG. 11A-11D Spectra of the angular velocity $\omega_\Pi$ for selected cases of the advanced rotor. (a) Two sets of blades, $\Gamma_\Pi$=0.002. (b) Two sets of blades, $\Gamma_\Pi$=0.014. (c) Four sets of blades, $\Gamma_\Pi$=0.002. (d) Four sets of blades, $\Gamma_\Pi$=0.014. For all the cases, $f_W$=0.593 Hz, $\alpha$=45°, d/D=0.25, S/D=0.33.

By using the power take-off simulator to change the resistant torque on the rotor with different sets of blades, the effect on the fluctuation of $\overline{\omega}_\Pi$ is presented in FIG. 11 in the form of magnitude spectrum. Four cases are compared: two rotor configurations (two sets versus four sets of blades) at two levels of $\Gamma_\Pi$ (0.002 and 0.014). Angle $\alpha$ is fixed at $\alpha=45°$. It is evident that all the spectra are similar to the one in FIG. 6 for the basic rotor at $\alpha=45°$; no fundamental difference is observed. The increased number of blade sets, however, does smooth the $\overline{\omega}_\Pi$ fluctuation to a certain extent. This can be seen by comparing the peak magnitudes at $f/f_W=2$: four sets of blades resulted in noticeably lower peaks (FIGS. 11C and 11D) than two sets of blades (FIGS. 11A and 11B).

Figure 12:
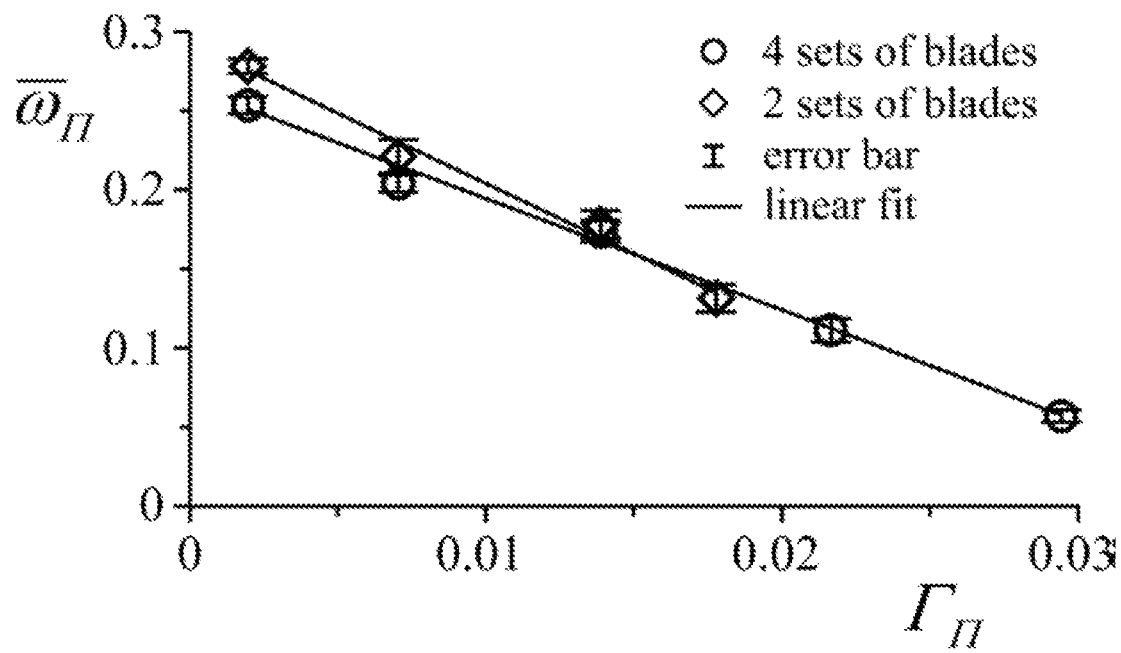
FIG. 12 Variation of the mean angular velocity $\overline{\omega}_\Pi$ with the resistant torque $\Gamma_\Pi$ for the advanced rotor having different sets of blades. Other parameters are: $f_W$=0.593 Hz, $\alpha$=45°, d/D=0.25, S/D=0.33.

It is intuitive that increase in the resistant torque results in decrease in the angular velocity. Experiments have validated that such a descending trend is linear for a specified rotor configuration with all other parameters fixed, as depicted in FIG. 12 in terms of $\overline{\omega}_\Pi$ versus $\Gamma_\Pi$. FIG. 12 also shows that the descending trend for four sets of blades is noticeably slower than that for two sets of blades, although no remarkable difference is observed between the two rotor configurations. It is noteworthy that, in presenting $\overline{\omega}_\Pi$, FIG. 12 included error bars to show the standard deviation among repetitive runs. In fact, in all the $\overline{\omega}_\Pi$ related figures throughout, $\overline{\omega}_\Pi$ at each data point was an average of three repetitive runs, each having an approximately 60-second-long time trace of the angular velocity. The standard deviation for $\overline{\omega}_\Pi$ is not presented in other figures except for FIG. 12, since lengths of error bars are generally no larger than the symbol sizes used in the figures.

Figure 13:
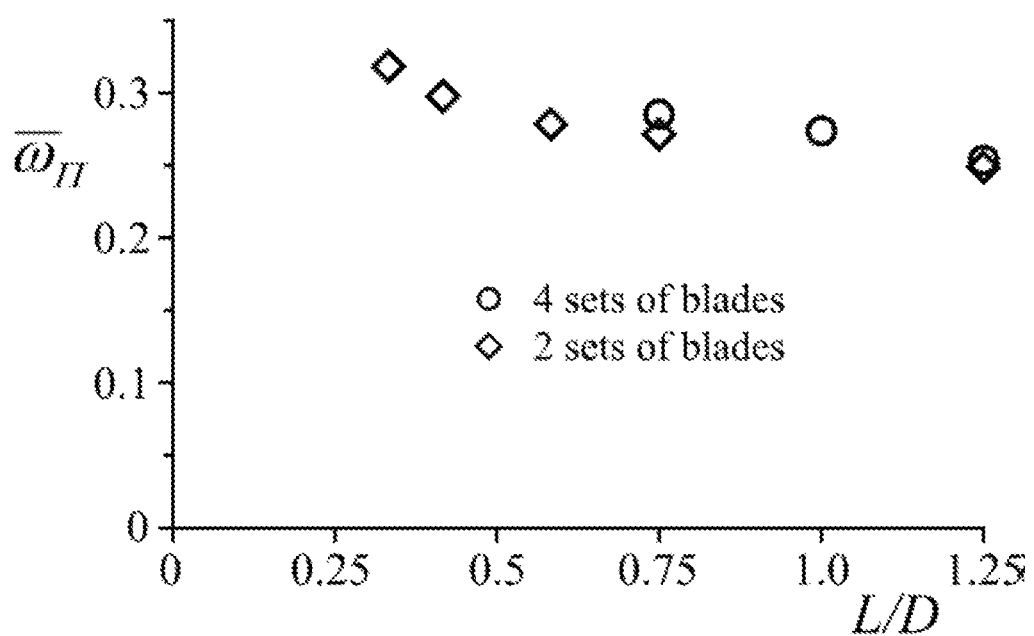
FIG. 13 Variation of the mean angular velocity $\overline{\omega}_\Pi$ with the normalized rotor length L/D for the advanced rotor having different sets of blades and at the minimum resistant torque $\Gamma_\Pi$=0.002. Other parameters are: $f_W$=0.593 Hz, $\alpha$=45°, d/D=0.25.

At the minimum resistant torque and with all other parameters fixed, change of the normalized rotor length L/D results in change of $\bar{\omega}_\Pi$, as shown in FIG. 13. For the rotor with two sets of blades, a monotonous decrease of $\bar{\omega}_\Pi$ is observed in the examined range 0.33≤L/D≤1.25, and the change at lower values of L/D is faster than at higher values. For the rotor with four sets of blades, it was only examined in 0.75≤L/D≤1.25 to avoid a very crowded blade layout at low values of L/D. In this range, values of $\bar{\omega}_\Pi$ for both rotor configurations are nearly overlapped.

D. Power

Using the power take-off simulator to approximate an electric generator, the power conversion capability of the advanced rotor was briefly explored. The results are presented using the capture width ratio (CWR).

Figure 14:
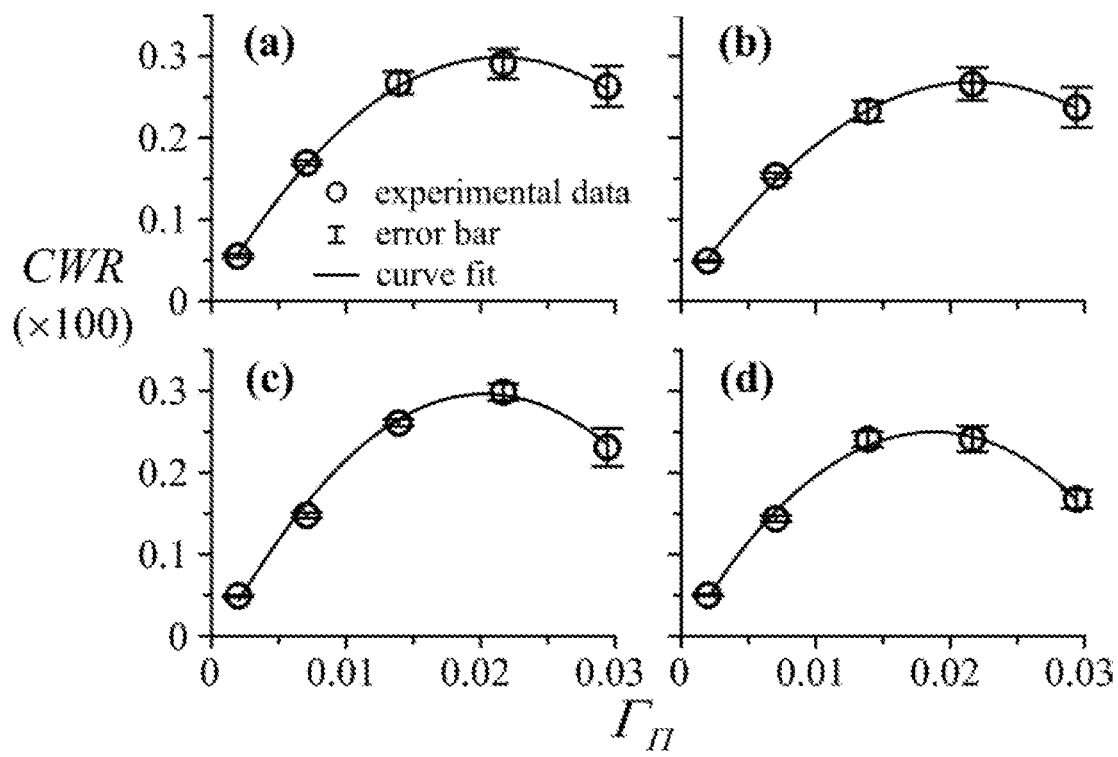
FIG. 14 Variation of the capture width ratio CWR with the resistant torque $\Gamma_\Pi$ for the advanced rotor having four sets of blades. (a) $\alpha$=0°. (b) $\alpha$=15°. (c) $\alpha$=30°. (d) $\alpha$=45°. For all the cases, $f_W$=0.593 Hz, d/D=0.25, S/D=0.33.

For a given rotor in waves with all geometric parameters and wave conditions fixed, CWR is a function of $\bar{\omega}_\Pi$ and $\Gamma_\Pi$, i.e., CWR=$\bar{\omega}_\Pi \Gamma_\Pi$ (Eqs. 3 and 4). It is also known that $\bar{\omega}_\Pi$ relies on $\Gamma_\Pi$, so CWR is essentially a function of $\Gamma_\Pi$. By systematically changing $\Gamma_\Pi$, a CWR~$\Gamma_\Pi$ relation can be obtained from experiments. FIG. 14 shows variation of CWR with $\Gamma_\Pi$ for the rotor with four sets of blades at four specified values of α. In FIG. 12, a nearly linear trend between $\bar{\omega}_\Pi$ and $\Gamma_\Pi$ has been demonstrated. Therefore, the CWR $\Gamma_\Pi$ relations in FIG. 14 are best presented by second-order polynomial curve fits (solid lines), which have yielded coefficients of determination (R-squared) higher than 0.99 for all the cases considered. Employing the second-order curve fits, corresponding peaks for $CWR_{max}$ are derived; they are plotted in FIG. 15.

As shown in FIG. 15, $CWR_{max}$ does not change by much with α in 0°≤α≤45° for the rotor with four sets of blades. In contrast, a remarkable climbing trend is clear for the rotor with two sets of blades. Specifically, at α=0° the value of $CWR_{max}$ for two sets of blades is only 37% of that for four sets of blades. The difference gradually decreases with increasing α till α=45°, where the two rotor configurations have nearly the same $CWR_{max}$. For all the cases examined (FIG. 15), the highest $CWR_{max}$ were obtained from the rotor with four sets of blades at α=30°, which is 0.003. Obviously, such a number represents a WEC with a very poor efficiency. This is mainly due to the lack of hydrodynamic optimization in the rotor design. Being the first attempt, the present rotor design is intended for demonstrating proof of concept and gaining preliminary understanding. Systematic hydrodynamic optimization of the rotor (e.g., employing different cup shapes, using three cups rather than four in one blade set, greatly increasing d/D, etc.) in waves is a long-term endeavor.

Example 2

In simple waves water particles perform orbital motion superimposed with a Stokes drift (Pickard and Pond, *Introductory Dynamical Oceanography*, 2nd ed, Oxford: Elsevier Butterworth-Heinemann, 1983). In irregular seas, coexistence of multiple dominant-frequency components or a broad-band frequency distribution (Pierson and Moskowitz, *Journal of Geophysical Research*, 69:5181-90, 1964) in conjunction with various wave propagation directions makes local water flows even more complicated. Therefore, for a WEC deployed in the ocean, surrounding water flows can be in any spatial directions that are continuously changing. To use this type of omnidirectional flows to drive a rotor for unidirectional rotation about a vertical axis, hydrodynamic design plays a critical role.

FIG. 1C illustrates one embodiment of a rotor design, which is employed in these studies. The rotor design consists of multiple sets of blades along a vertical shaft; each set has multiple blades evenly distributed circumferentially. Two sets of three-blade rotor configuration were adopted in this proof-of-concept study. Each blade has a hydrofoil-shaped cross section in a NACA0021 profile. The blade has three segments along the span: a vertical segment, a horizontal segment, and a smooth bend in between. Focusing on an assembled set of blades, the vertical layout represents a typical Darrieus H-rotor (Mohamed, *Energy*, 47:522-30, 2012), and the horizontal layout is essentially a Wells' rotor (Raghunathan, *Progress in Aerospace Sciences*, 31:335-86, 1995).

The Darrieus H-rotor has long been applied to vertical axis wind turbine designs. It performs unidirectional rotation about its shaft when winds are blowing in any direction normal to the shaft but not along the shaft. In contrast, a Well's rotor is specifically designed to realize unidirectional rotation about its shaft in bidirectional flows along the shaft but not normal to the shaft. By combining the two rotor designs as shown in FIG. 1C, the vertical layout is responsive to flows normal to the shaft with low resistance to flows along the shaft, whereas the horizontal layout is responsive to flows along the shaft with low resistance to flows normal to the shaft. As a result of the combination, the newly formed rotor is expected to perform unidirectional rotation no matter in which spatial direction a flow passes by. Such a unique behavior of the rotor would be perfect for energy harvesting from ocean waves.

In an attempt to make the rotor motion as smooth as possible in dynamically changing flow directions, three considerations are implemented in the rotor design. First, multiple sets of blades with reduced dimensions over a single set of blades of relatively large dimensions are employed. It is expected to cope well with the flow non-uniformity, particularly in irregular waves. Second, there is an offset angle along the rotation direction between two adjacent sets of blades. Such arrangement should help on reducing interaction between the two sets and, thus, gaining energy absorption efficiency. Third, a bend is used between the vertical and horizontal portions of each blade for a smooth transition. The bend is intended to improve the rotor responsiveness during the time with inclined flows transitioning between horizontal and vertical directions.

Flow interaction with the rotor is highly nonlinear. Therefore, the effectiveness of the above three considerations needs to be validated as a part of the optimization process. The following studies focus on the proof-of-concept study of utilizing omnidirectional flows to drive the rotor for unidirectional rotation.

A. Experimental System

All experiments were carried out in a wave flume of inner dimensions 15 m (L)×1 m (W)×1.3 m (H). To directly validate the rotor's capability on performing unidirectional rotation about a vertical axis in waves, one type of experiment was to expose the rotor in simple waves; the rotor has only one degree of freedom (DOF)—rotation about its vertically mounted shaft. To gain fundamental understanding on the rotor's responsiveness in some specified flow directions, another type of experiment was also carried out by moving the rotor in still water in a controlled manner. Specifically, three motion modes of the rotor were examined: horizontal oscillation, vertical oscillation, and circular orbital motion in a vertical plane. In all these three modes, the rotor shaft was always aligned vertically and was performing translation only. The orbital motion of the rotor in still water was used to approximate a fixed rotor (with one DOF) in simple deep waves where water particles perform circular orbital motion (drift was neglected) (Pickard and Pond, *Introductory Dynamical Oceanography*, 2nd ed, Oxford: Elsevier Butterworth-Heinemann, 1983).

To translate the rotor in still water, a custom-designed machine has been built. The machine sits on top of the wave flume. The machine has a servo motor to translate, through a gearbox and cam, a slider along a circular orbit in a vertical plane. Both the radius of the orbit and the revolving speed of the slider are adjustable. By directly fastening the rotor holder to the slider, the rotor translates along a circular orbit. By fastening the rotor holder to a vertical rail, the rotor performs horizontal oscillation. By turning the whole machine by 90° about a crossover beam and by fastening the rotor holder to the same vertical rail (now horizontal) with the rotor shaft vertically aligned, the rotor performs vertical oscillation. The rotor holder holds the rotor shaft in place via two sleeve bearings, giving the rotor one DOF rotation. For the case of testing the rotor in waves, the machine simply functions as a non-moving support.

A small-scale model rotor (FIG. 1C) has been fabricated for testing. It has a rotor diameter of D=0.5 m (the diameter of the largest circular swept area). Individual blades are all identical. Each blade has a hydrofoil (NACA0021) cross section with a chord length of 76.2 mm. Along the curved span the blade consists of a straight 50.8-mm long vertical segment, a straight 50.8-mm long horizontal segment, and a circular bend of radius 50.8 mm (for the central curved plane) in between. The two extreme ends of the blade are rounded by revolving the hydrofoil cross section about its centerline. Two sets of blades, with each having three blades evenly distributed circumferentially, are fastened to the rotor shaft in series. From the highest point of the lower set of blades to the lowest point of the upper set of blades there is a spacing of 30 mm along the shaft. Between the two sets there is also an angular offset of 60° about the shaft.

For the three types of still water experiments, the peak-to-peak amplitude of oscillation (H) or the diameter of the circular motion (also H) for the rotor has been examined at three different values, H=114 mm, 216 mm, and 318 mm. At each value of H, the oscillating frequency (f) or circulating frequency (also f) were also varied at three different values, f=0.5 Hz, 0.75 Hz, and 1 Hz. For wave experiments, only one combination of wave parameters is explored: wave height H=223 mm, wave frequency f=0.593 Hz. In this case, the water depth in the wave flume was 1 m, and the rotor was submerged with the highest point of the blades to be 100 mm beneath the free surface in still water.

To obtain time traces of the rotor's angular velocity under various conditions, a dial was coaxially fixed to the rotor shaft from the top end, and an iPhone 6 Plus was employed to videotape the dial rotation. Videos were then manually processed to extract angular information. All the planned experiments were repeated three times during data acquisition.

B. Results and Discussion

The experimental exploration started with the still water approach. Due to the long lasting periodic motion (e.g., oscillation or circular motion) of the rotor in a confined water body, the rotor kept passing through its own wake generated from earlier cycles. Therefore, the water flow around the rotor was highly chaotic and turbulent rather than still. Yet, such complex flow conditions have never stopped the rotor from performing unidirectional rotation about its vertically aligned shaft while translating in any directions. Specifically, profound and consistent unidirectional rotation has been observed all the time with the rotor oscillating in horizontal and vertical directions, and orbiting along circular paths. By directly exposing the rotor in waves, smooth unidirectional rotation was also clearly demonstrated.

Time traces of the instantaneous angular velocity $\omega$ for four typical cases are shown in FIG. 16 in a dimensionless form $\omega_\Pi$ (defined in equation 1).

$\omega_\Pi$ represents the ratio of two tangential speeds: one is the rotor's tip speed due to rotation, and the other is either the maximum translation speed of the rotor in still water or the free-surface water speed along a circular orbit in deep waves. The dimensionless $\bar{\omega}_\Pi$ and $\Delta\omega_\Pi$ were obtained the same way.

As shown in FIG. 16, for both horizontal and vertical oscillations, unidirectional rotations of the rotor are evident. In both cases the angular velocity fluctuates at a dominant frequency that is two times of the oscillation frequency. The average value and fluctuation level of the angular velocity for the vertical oscillation (FIG. 16(*b*)) is much higher than that for the horizontal oscillation (FIG. 16(*a*)). Such behavior has also been reflected in the orbital motion (FIG. 16(*c*)), where the peak velocity gained during nearly vertical phases is much greater that that during nearly horizontal phases. The velocity discrepancy can be fixed by increasing the length of the vertical portion of each rotor blade. For the rotor in waves (FIG. 16(*d*)), however, the discrepancy is hardly noticeable. This was mainly due to the fact that the waves generated in the wave flume for this testing case were intermediate waves rather than deep waves. As a result, water particles move along elliptical paths with the major axis in the horizontal direction, which makes the water flow stronger horizontally than vertically.

FIG. 17 compares the relative fluctuation of the angular velocity, $\Delta\bar{\omega}_\Pi/\bar{\omega}_\Pi$, among the four cases discussed in FIG. 16. $\Delta\bar{\omega}_\Pi$ is evaluated by calculating the standard deviation of a time trace of $\omega_\Pi$. Obviously, the rotor in waves presents the smoothest rotation with the lowest fluctuation level.

Figure 18:
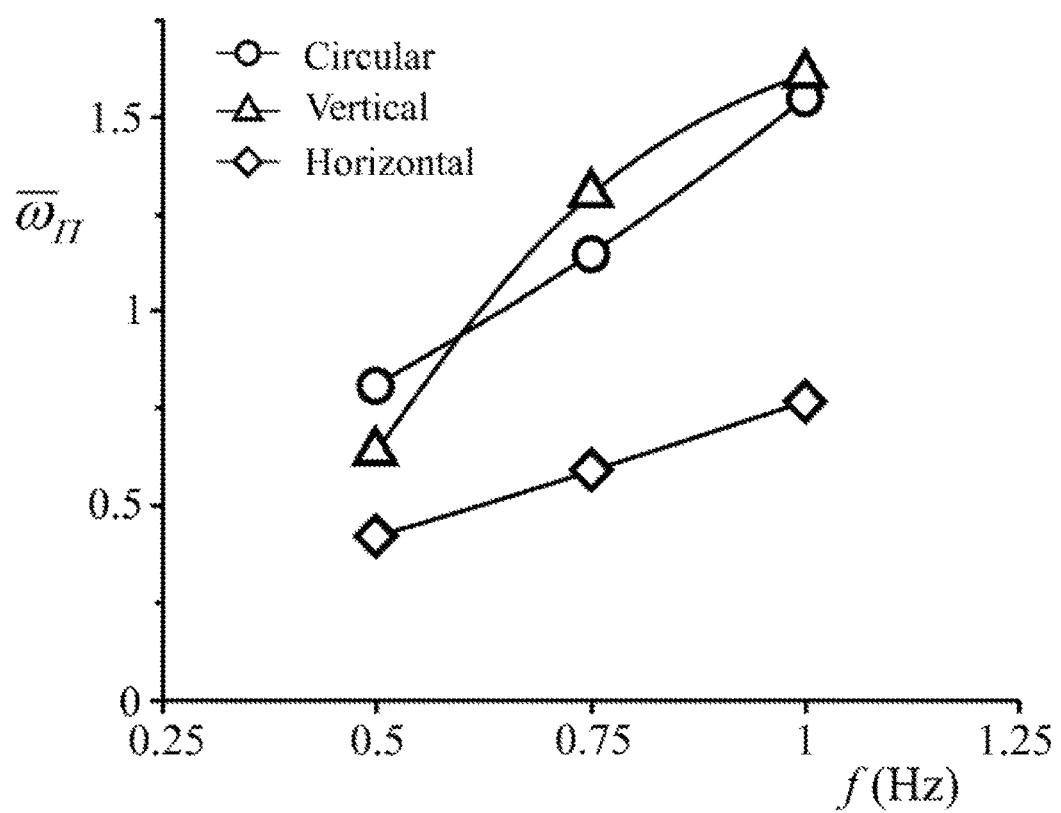
FIG. 18. Effect of the frequency change on the normalized average angular velocity. For all the examined cases, H=216 mm.

To better understand the rotor responsiveness to flows from different directions, a parametric study has been conducted by moving the rotor in still water. FIG. 18 presents the frequency effect on the average velocity $\bar{\omega}_\Pi$ in three specified motion types. $\bar{\omega}_\Pi$ was calculated by averaging three repetitive runs for each parametric combination; every run provided a 75-second record of instantaneous angular velocity. As shown in FIG. 18, at a fixed H, increase of the frequency led to nearly linear increase of $\bar{\omega}_\Pi$ in all the three motion types. It is very interesting that the vertical oscillation achieved angular velocities close to, and some time even higher than, the circular motion. The horizontal oscillation, on the other hand, was not as strong as the other two in making the rotor rotate.

Figure 19:
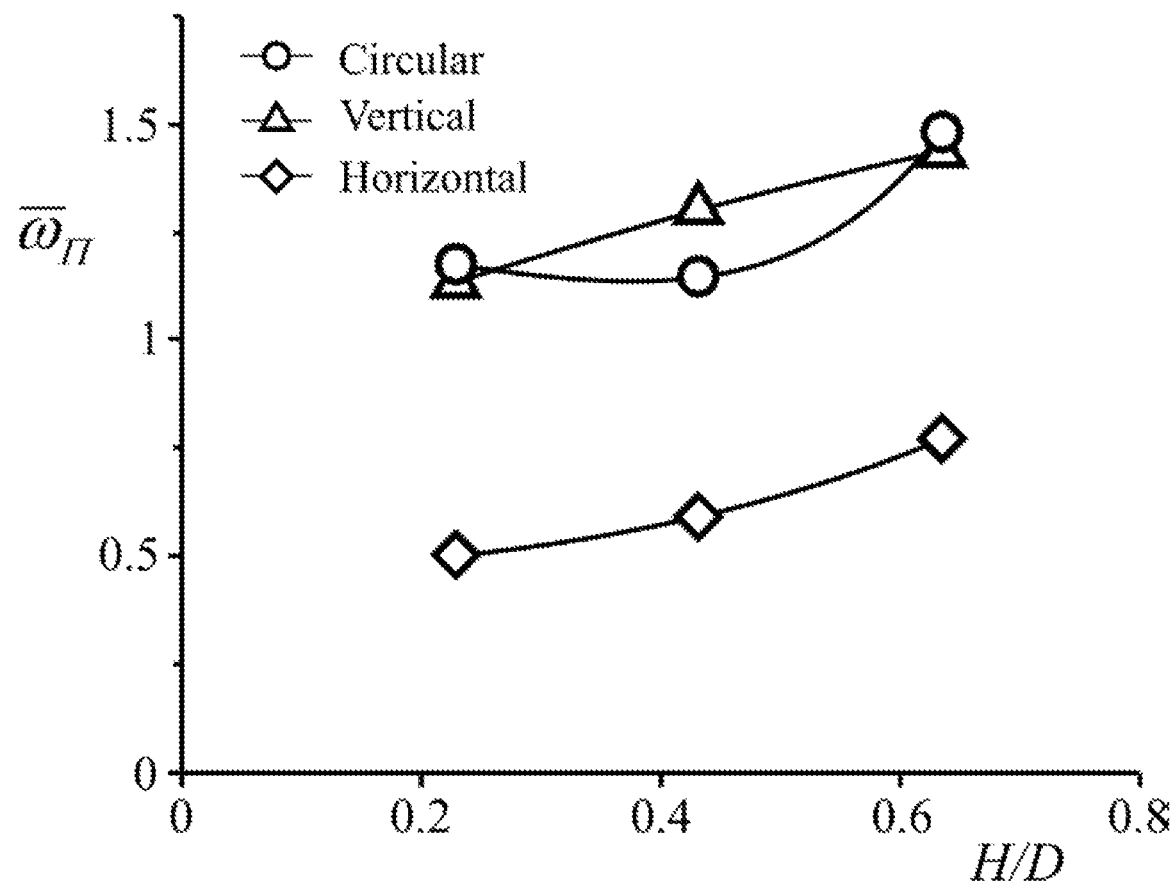
FIG. 19. Effect of H/D on the normalized average angular velocity in three specified motion types. For all the examined cases, f=0.75 Hz.

At a fixed frequency f and with varying value of H/D (normalized H), the averaged velocity $\bar{\omega}_\Pi$ for the three motion types were plotted and compared in FIG. 19. Similar to FIG. 18, the values of $\bar{\omega}_\Pi$ for the vertical oscillation and circular motion are quite close to each other in the examined range of H/D, and the corresponding values for the horizontal oscillation are much lower. It is noteworthy though, that increase of H/D only caused a mild increase of $\bar{\omega}_\Pi$ in all the three types of motion. That is in comparison with a much rapid change in FIG. 18.

The invention claimed is:

1. A vertical axis unidirectional rotor for wave energy conversion, said rotor comprising:
   (i) a vertical rotor shaft having a proximal end configured to connect with a generator and a distal end opposite the proximal end; and (ii) a plurality of blades, the plurality of blades being (a) connected to the rotor shaft by spokes and (b) distributed in various locations axially, radially and circumferentially with respect to the rotor shaft; wherein the plurality of blades are drag-type cup-like blades, lift-type fish-like blades, lift-type wing-like straight blades, lift-type wing-like bent blades, or a combination of different types of blades, and the rotor is configured for unidirectional rotation in waves, wherein the drag-type cup-like blades are a hemispherical or semi-elliptical shell having a rim and wherein plane of the drag-type blade rim is not perpendicular and not parallel to the long axis of the rotor shaft, wherein a plurality of the vertical axis unidirectional rotors are mounted on a supporting platform and are configured to maintain a vertical orientation with respect to the supporting platform, and during operation the supporting platform maintains a horizontal orientation; and wherein the plurality of blades extend above the supporting platform.

2. The rotor of claim 1, wherein the lift-type fish-like blades have a revolved hydrofoil shape about its centerline with a circular or elliptical cross section normal to the centerline.

3. The rotor of claim 1, wherein both the straight and bent lift-type wing-like blades comprise a rounded leading edge and a sharp trailing edge, and the blade's cross section is in a hydrofoil shape.

4. The rotor of claim 1, wherein the rotor is monolithic.

5. The rotor of claim 1, wherein the plurality of blades are lift-type blades.

6. The rotor of claim 1, wherein the plurality of blades are drag-type blades.

7. The rotor of claim 1, wherein the blades include both lift-type blades and drag-type blades.

8. The rotor of claim 1, wherein the supporting platform is configured to be submerged.

9. The wave energy station of claim 8, further comprising an energy storage device.

10. The wave energy station of claim 8, further comprising an energy transmission device.

11. The wave energy station of claim 8, further comprising an anchor.

12. The wave energy station of claim 11, wherein the anchor is a slack mooring.

13. The wave energy station of claim 8, further comprising at least one buoy.

\* \* \* \* \*